US008837185B2

(12) United States Patent
Goerges et al.

(10) Patent No.: US 8,837,185 B2
(45) Date of Patent: Sep. 16, 2014

(54) CONTROL OF A MODULAR CONVERTER HAVING DISTRIBUTED ENERGY STORES WITH THE AID OF AN OBSERVER FOR THE CURRENTS AND AN ESTIMATING UNIT FOR THE INTERMEDIATE CIRCUIT ENERGY

(75) Inventors: Daniel Goerges, Birkheim (DE); Michal Izak, Kaislerslautern (DE); Steven Liu, Kaiserslautern (DE); Philipp Muench, Kaiserslautern (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 13/578,664

(22) PCT Filed: Feb. 11, 2010

(86) PCT No.: PCT/EP2010/000967
§ 371 (c)(1),
(2), (4) Date: Aug. 13, 2012

(87) PCT Pub. No.: WO2011/098100
PCT Pub. Date: Aug. 18, 2011

(65) Prior Publication Data
US 2012/0314466 A1    Dec. 13, 2012

(51) Int. Cl.
*H02M 7/217* (2006.01)
*G05F 3/06* (2006.01)

(52) U.S. Cl.
USPC ............................................. 363/127; 307/151

(58) Field of Classification Search
USPC ............. 363/78, 125, 127, 132; 307/105, 151
See application file for complete search history.

(56) References Cited

U.S. PATENT DOCUMENTS 4,259,620 A * 3/1981 Oates et al. .................. 318/802

5,329,222 A * 7/1994 Gyugyi et al. ............... 323/207
(Continued)

FOREIGN PATENT DOCUMENTS

WO    2008/067784 A1    6/2008

OTHER PUBLICATIONS

Philipp Munch, et al.: "Modeling and current control of modular multilevel converters considering actuator and sensor delays", IECON 2009-35th Annual Conference of IEEE Industrial Electronics (IECON 2009)-Nov. 3-5, 2009-Porto, Portugal, IEEE Piscataway, NJ, USA, pp. 1633-1638.

(Continued)

*Primary Examiner* — Timothy J Dole
*Assistant Examiner* — Yusef Ahmed
(74) *Attorney, Agent, or Firm* — Laurence A. Greenberg; Werner H. Stemer; Ralph E. Locher

(57) ABSTRACT

Methods and configurations controlling a converter having controllable power semiconductors, compare actual and target state values to obtain control difference values for a control unit producing setting voltage values. Control electronics provide control signals according to setting voltage values and transmit them to power semiconductors. The control unit generates voltage values so control difference values become small. Current and converter energy controls and energy balancing are performed jointly, actual state values are calculated by an observing unit based on setting voltage values considering measured current values and actual state intermediate-circuit energy values are calculated by an estimating unit considering measured intermediate-circuit energy values of positive and negative voltage sources. The observing and estimating units model the converter so actual state current and intermediate-circuit steady-state energy values correspond to error-free current and intermediate-circuit energy values. A periodic time-variant gain controller receives error-free values.

39 Claims, 5 Drawing Sheets

(56) References Cited

U.S. PATENT DOCUMENTS

| | | | | |
|---|---|---|---|---|
| 5,448,442 | A * | 9/1995 | Farag | 361/24 |
| 6,021,251 | A * | 2/2000 | Hammer et al. | 388/801 |
| 6,611,442 | B2 * | 8/2003 | Hanaoka et al. | 363/84 |
| 7,471,529 | B2 * | 12/2008 | Jin et al. | 363/87 |
| 7,960,871 | B2 | 6/2011 | Dommaschk et al. | |
| 8,130,523 | B2 * | 3/2012 | Benesch | 363/89 |
| 2005/0169018 | A1 * | 8/2005 | Hatai et al. | 363/37 |
| 2007/0024213 | A1 * | 2/2007 | Shteynberg et al. | 315/291 |
| 2009/0134714 | A1 * | 5/2009 | Tarkiainen et al. | 307/105 |
| 2010/0020577 | A1 * | 1/2010 | Dommaschk et al. | 363/63 |
| 2010/0060235 | A1 * | 3/2010 | Dommaschk et al. | 320/128 |
| 2010/0066174 | A1 * | 3/2010 | Dommaschk et al. | 307/75 |
| 2010/0067266 | A1 | 3/2010 | Dommaschk et al. | |
| 2010/0118578 | A1 * | 5/2010 | Dommaschk et al. | 363/127 |
| 2010/0195361 | A1 * | 8/2010 | Stem | 363/132 |
| 2010/0321038 | A1 * | 12/2010 | Dommaschk et al. | 324/658 |
| 2011/0032735 | A1 * | 2/2011 | Jin et al. | 363/39 |
| 2012/0277830 | A1 * | 11/2012 | Arfin et al. | 607/62 |

OTHER PUBLICATIONS

Singh B.N., et al.: "Fuzzy control of integrated current controlled converter-inverter fed cage induction motor drive", Industrial Automation and Control, 1995 (I A & C '95), IEEE/IAS International Conference on (Cat. No. 95th8005), Hyderabad, India, Jan. 5-7, 1995, New York, NY, USA, IEEE, US LNKD-DOI: 10.1109/IACC.1995.465850, pp. 153-159, ISBN: 978-0-7803-2081-9.

* cited by examiner

CONTROL OF A MODULAR CONVERTER HAVING DISTRIBUTED ENERGY STORES WITH THE AID OF AN OBSERVER FOR THE CURRENTS AND AN ESTIMATING UNIT FOR THE INTERMEDIATE CIRCUIT ENERGY

BACKGROUND OF THE INVENTION

Field of the Invention

The invention relates to a method for controlling a converter having controllable power semiconductors, wherein actual state values $\hat{x}(k)$ describing the state of the converter are compared with desired state values $x_{desired}(k)$, with control difference values being obtained, the control difference values are fed to a control unit, which generates actuating voltage values $u(k)$ at its output, and control electronics provide control signals depending on the actuating voltage values $u(k)$ and transmit said control signals to the power semiconductors of the converter, wherein the control unit generates actuating voltage values $u(k)$ such that the control difference values become as small as possible.

Such a method is already known from WO 2008/067784 A1, for example. The method disclosed therein is provided for controlling a multilevel converter for high-voltage direct-current transmission, wherein the converter is a self-commutated converter comprising turn-off power semiconductors. Thus, the converter consists of a bridge circuit formed by power semiconductor valve branches, wherein each power semiconductor valve branch has a series circuit formed by submodules. Each submodule in turn has a power semiconductor circuit interconnected with a capacitor such that either the voltage dropped across the capacitor or else a zero voltage can be generated at the output terminals of each submodule. By virtue of the series circuit formed by the submodules, the voltage dropped across the power semiconductor valve can be set in steps, wherein the level of a step corresponds to the voltage dropped across the capacitor unit of a submodule.

BRIEF SUMMARY OF THE INVENTION

The invention is based on the object of proposing a method for controlling a converter having controllable power semiconductors by means of which the current control and the converter energy control and the energy balancing can be performed jointly.

In order to achieve this object, in a method of the type specified in the introduction, according to the invention the actual state values $\hat{x}(k)$ are calculated by an observer unit proceeding from the actuating voltage values $u(k)$ and taking account of measured current values $x(k)$, actual state intermediate circuit energy values $\hat{w}(k)$ are calculated by an estimator unit taking account of measured intermediate circuit energy values $w(k)$ of the positive-side and of the negative-side three-phase voltage source of the converter, wherein the observer unit and the estimator unit model the converter, such that the calculated actual state current values $\hat{x}(k)$ and actual state intermediate circuit energy values $\hat{w}(k)$ in the steady state correspond to the fault-free current and intermediate circuit energy values, and the fault-free current and intermediate circuit energy values $\hat{x}(k)$, $\hat{w}(k)$ are fed to a control unit embodied as a periodic controller having a periodically time-variant gain.

What is essential to the method according to the invention is firstly the use of a model for the observer unit in the form of a mathematical state space model which structurally takes account of all converter currents. What is furthermore essential is the use of the estimator unit for estimating the intermediate circuit energies of the power semiconductor branches or phase modules of the converter, divided into the positive-side and the negative-side three-phase voltage source. One essential advantage of the method according to the invention is that all control aims for the converter are taken into account by said method. By virtue of the multi-variable control provided, superordinate converter energy control present in the prior art and the balancing of the intermediate circuit energies of the positive-side and of the negative-side three-phase voltage source can be obviated. By jointly pursuing all control aims, better control is also possible, which can be effected in a weighted manner in accordance with the importance of the control aims. As a result, the control is also additionally accelerated and a predefined behavior is obtained exactly.

On account of the accelerated control achieved, the intermediate circuit energy control and the balancing of the energies of the positive-side and of the negative-side three-phase voltage source can be improved such that either a smaller number of controllable power semiconductors or a lower capacitor capacitance of the converter suffices to control the same power supply system fault situations. This is manifested in lower converter costs.

Better control of power supply system fault situations also means a shorter failure time or a lower failure probability, which should be advantageous from an economic standpoint for power supply system operators.

In order to achieve the advantages indicated above, it is particularly expedient if an observer unit having a periodically time-variant system model is used, which model, proceeding from the general state equation $$\dot{x} = A \cdot x + B \cdot u$$

with $x$ as state variable, $\dot{x}$ as time derivative of the state variable, $A$ as system matrix, $B$ as input matrix and $u$ as input variable, has a time-invariant system matrix $A_{PLTV}$ and a time-variant input matrix $B_{PLTV}(t)$ with $$x_{PLTV} = \begin{pmatrix} x \\ x_{\alpha\beta} \\ x_{dq^{-1}} \\ w_{\alpha\beta} \\ w_{dq^{-1}} \\ w \end{pmatrix},$$

where $x$ denotes the measured, Park-transformed current, $x_{\alpha\beta}$ denotes the alpha-beta-transformed current and $x_{dq^{-1}}$ denotes the doubly Park-inverse-transformed measured current (negative phase sequence system), $w_{\alpha\beta}$ denotes the alpha-beta-transformed, measured intermediate circuit energy value sums of positive-side and negative-side three-phase voltage sources and $w_{dq^{-1}}$ denotes the alpha-beta-transformed, measured intermediate circuit energy value differences between positive-side and negative-side three-phase voltage sources, and $w$ denotes the measured intermediate circuit energy values of the entire converter.

Advantageously, the desired state values are desired current values $x_{desired}(k)$ and desired intermediate circuit energy values $w_{desired}(k)$.

A further solution for achieving the object indicated above is seen in the fact that, proceeding from the prior art indicated in the introduction, according to the invention the actual state values $\hat{x}(k)$ are calculated by an observer unit proceeding from the actuating voltage values $u(k)$ and taking account of measured current values x(k), actual state intermediate circuit energy values $\hat{w}(k)$ are calculated by an estimator unit taking account of measured intermediate circuit energy values w(k) of the positive-side and of the negative-side three-phase voltage source of the converter, wherein the observer unit and the estimator unit model the converter, such that the calculated actual state current values $\hat{x}(k)$ and actual state intermediate circuit energy values $\hat{w}(k)$ of the total energy of the converter and the difference in the state intermediate circuit energy values w(k) in the steady state correspond to the fault-free current and intermediate circuit energy values, and the fault-free current $\hat{x}(k)$ and intermediate circuit energy values $\hat{w}(k)$ are fed to a control unit embodied as a periodic controller having a periodically time-variant gain.

In this alternative solution, advantageously, the desired state values are desired current values $x_{desired}(k)$ and desired intermediate circuit energy values $w_{desired}(k)$.

A contribution is advantageously also made to the control accuracy of the method according to the invention if the desired state values are formed from predefined desired values by means of a periodically operating feedforward control unit.

The periodically time-variant gain can be achieved in various ways in the periodic controller. It is considered to be particularly advantageous if in the periodic controller the periodically time-variant gain is implemented by means of periodic changeover of controller matrices.

In order to obtain a particularly high control accuracy, the actual state values $\hat{x}(k)$, are calculated by an observer unit proceeding from the actuating voltage values u(k) and the state measurement values $y_d(k)$ wherein the observer unit takes account of disturbance effects, such that the actual state values $\hat{x}(k)$ in the steady state correspond to the undisturbed current measurement values freed of disturbance effects.

In this embodiment of the method according to the invention, the observer unit is designed such that the converter is transferred into a mathematical model that takes account of disturbance effects. In this case, the state of the converter is expediently described by the controlled variables, that is to say, for example, the power supply system, DC and circulating currents, wherein the controlled variables are combined in a state vector $\hat{x}(k)$. The same correspondingly applies to the desired variables, which are likewise combined in a desired vector $x_{desired}(k)$. Proceeding from the actuating voltage values made available on the input side, the observer unit models the converter. In particular, the dynamic behavior of the converter is mathematically simulated, wherein expedient matrices are derived which are applied to the state vector or the vector of the manipulated variables u(k). On the output side of the observer unit, a set of actual state values $\hat{x}(k)$ is then provided, wherein the actual state values $\hat{x}(k)$ correspond to state measurement values which are free of disturbance effects in the steady state. The actual state values $\hat{x}(k)$ correspond in the steady state in other words to undisturbed measurement values of the state of the converter and are fed to the control. According to the invention, the control can therefore be performed relatively precisely.

The disturbance effects can be based on power supply system faults, inter alia. Specifically, the input variables of the system have to be measured, wherein the measurement can be faulty. A faulty measurement can also be interpreted as a disturbance variable at the input of the system.

Furthermore, deviations in the actuating voltages can arise, which are likewise manifested as disturbance effects.

Disturbances at the output act as a disturbance directly on the controlled variables.

Component deviations also cause, in the steady-state case, constant deviations which are likewise taken into account as disturbances and compensated for in the method according to the invention. The deviations of the parameters cause a control error which can be mapped onto a steady-state disturbance of the system.

Harmonics were also interpreted as disturbances in the present context and corrected by the method according to the invention.

Expediently, the observer unit provides, besides the undisturbed actual state values $\hat{x}(k)$, disturbed state model measurement values $\hat{y}_d(k)$ corresponding to measurable state measurement values $y_d(k)$, wherein the state model measurement values $\hat{y}_d(k)$ are compared with state measurement values $y_d(k)$ obtained by measurements, with a model measurement value deviation being obtained, the model measurement value deviation is fed to the observer unit on the input side and the modeling of the converter is carried out such that the model measurement value deviation is as small as possible. In accordance with this expedient further development, the modeling of the converter is effected with a feedback, wherein use is made of the fact that the chosen mathematical model of the converter yields not only the undisturbed actual state values $\hat{x}(k)$ but also the state model measurement values beset by disturbance effects. The state model measurement values therefore correspond to the state measurement values obtainable by real measurements. A comparison of the state measurement values with the state model measurement values, that is to say in other words the formation of the model measurement value deviation between these two variables, therefore provides information about the quality of the modeling. The model measurement value deviation is fed to the observer unit as second input variable. Its minimization therefore improves the control method. In the ideal case, the model measurement value deviation is equal to zero.

For expedient further development in this regard, the model measurement value deviation is fed to the observer unit via a feedback unit, which expediently amplifies the model measurement value deviation. If the state of the converter is described by means of a state vector $\hat{x}(k)$, for example a vector consisting of five currents of the converter, a vector for the model measurement value deviation also arises. In this case, the feedback unit applies a matrix consisting of constants to the vector of the model measurement value deviation. In other words, the model measurement value deviation is amplified by said matrix in a manner that is expedient for the further modeling of the converter with minimization of the model measurement value deviation.

Expediently, the converter is modeled with the aid of a state space model in accordance with $$\hat{x}'(k+1)=\Phi\hat{x}'(k)+\Gamma u(k)$$

$$\hat{y}_d(k)=H\hat{x}'(k)$$

wherein $\hat{x}'(k)$ corresponds to a state vector of the converter including disturbed states, u(k) corresponds to a vector of the actuating voltages, $\Phi$, $\Gamma$ and H correspond to model matrices, and $\hat{y}_d(k)$ corresponds to a vector of state model measurement values beset by disturbances. k indicates the respective sampling step. The system model chosen is the discrete form of a time-continuous differential equation and is also designated as a difference equation.

In the case of a multilevel converter comprising power semiconductor valve branches interconnected with one another to form a six-pulse bridge, wherein each power semiconductor valve branch consists of a series circuit formed by submodules, wherein each submodule has a power semiconductor circuit and also a capacitor, it suffices to describe the state of the converter with just five currents, since the other currents of the converter can be calculated from the five state variables. The currents occurring at the converter are, for example, power supply system currents, DC currents and also circulating currents between the valve branches of the converter. In order to be able to take account of disturbance effects in the model, the state vector $\hat{x}'(k)$ is extended by the disturbed state measurement values $\hat{y}_d(k)$ to form $\hat{x}'(k)$.

In order to increase the control accuracy even further, in one advantageous development of the method according to the invention, delay effects are additionally taken into account during the modeling of the observer unit, such that the actual state values $\hat{x}(k)$ in the steady state correspond to undelayed and undisturbed current measurement values freed of delay effects.

A set of actual state values $\hat{x}(k)$ is provided on the output side of the observer unit, wherein the actual state values $\hat{x}(k)$, correspond to state measurement values that are free of disturbance and delay effects. The actual state values $\hat{x}(k)$, correspond in other words to undelayed and undisturbed measurement values of the state of the converter and are fed to the control. According to the invention, therefore, the control can be performed more rapidly without instabilities having to be feared.

Expediently, the observer unit provides, besides the undisturbed and undelayed actual state values $\hat{x}(k)$, disturbed and delayed state model measurement values $\hat{y}_d(k)$ corresponding to measurable state measurement values $y_d(k)$ wherein the state model measurement values $\hat{y}_d(k)$ are compared with state measurement values $y_d(k)$ obtained by measurements, with a model measurement value deviation being obtained, the model measurement value deviation is fed to the observer unit on the input side and the modeling of the converter is carried out such that the model measurement value deviation is as small as possible.

In accordance with this expedient further development, the modeling of the converter is effected with a feedback, wherein use is made of the fact that the chosen mathematical model of the converter yields not only the undisturbed and undelayed actual state values $\hat{x}(k)$ but also the state model measurement values beset by disturbance and delay effects. The state model measurement values therefore correspond to the state measurement values obtainable by real measurements. A comparison of the state measurement values with the state model measurement values, that is to say in other words the formation of the model measurement value deviation between these two variables, therefore provides information about the quality of the modeling. The model measurement value deviation is fed to the observer unit as second input variable. Its minimization therefore improves the control method. In the ideal case, the model measurement value deviation is equal to zero.

In one preferred variant of the development of the method according to the invention, taking account of delay effects comprises taking account of measurement delays that arise during the digital detection of the electric currents of the converter and taking account of actuating delays caused by the control electronics. During the detection of the state measurement values, for example the currents of the converter are measured. The measurement signal obtained in this case is continuously sampled in sampling steps k, with samples being obtained. The samples are subsequently digitized. The modeling of the measurement delay established in this case is expediently effected under the assumption that the measurement delay corresponds to a time duration of four sampling steps. It has been found that such an assumption is expedient for a self-commutated multilevel converter for high-voltage direct-current transmission.

In accordance with a further configuration of the invention, an actuating delay $\tau$ is modeled in accordance with $$\tau = (l-1) \cdot T + \tau'$$

wherein l corresponds to the number of sampling steps whose sum is less than the actuating delay $\tau$. $\tau'$ is designated as the remainder and is always shorter than the time duration between two sampling steps T. In this modeling of the actuating delay, a magnitude of l=2 has proved to be expedient for a multilayer self-commutated converter.

In order to be able to take account of delay effects in the model, the state vector $\hat{x}(k)$ is extended by the delayed state measurement values $\hat{y}_d(k)$ to form $\hat{x}'(k)$.

In order to achieve a particularly fast control with good stability, in a further advantageous development of the method according to the invention, state intermediate circuit energy values are determined from measured intermediate circuit energy values by means of an estimator unit that has recourse to a signal model of the intermediate circuit energy values, wherein the estimator unit calculates the parameters of the signal model of the intermediate circuit energy values whilst determining in each case a DC variable representing state intermediate circuit energy values of the positive-side and of the negative-side three-phase voltage source of the converter, and state intermediate circuit energy values are fed to the control unit in addition to the state current values.

According to the invention, therefore, in addition to the observer unit an estimator unit is present, which is used to determine state intermediate circuit energy values in the form of DC variables by means of a signal model of the intermediate circuit energy values; the calculated state intermediate circuit energy values are combined to form a state intermediate circuit energy vector and are fed to the control unit in addition to the state current vector. The estimator unit therefore models the power semiconductor branches or phase modules or estimates the energy content of the phase modules. Desired intermediate circuit energy values are also combined to form a desired intermediate circuit energy vector.

A set of state current values $\hat{x}(k)$ is provided on the output side of the observer unit, wherein the state current values $\hat{x}(k)$ correspond to state current measurement values that are free of disturbance and, if appropriate, also delay effects. The state current values $\hat{x}(k)$ correspond in other words to undelayed and/or undisturbed current measurement values of the converter and are fed to the control. According to the invention, therefore, with regard to the current control variables, the prerequisites for fast control are provided, without instabilities having to be feared in this regard.

At the output of the estimator unit, state intermediate circuit energies are present, which are likewise generated rapidly on account of their formation by means of estimation, such that no slow control behavior is caused by the intermediate circuit energy control variables either.

In this way, this development of the method according to the invention makes it possible to carry out the control of the converter on the basis of an integrated consideration whilst simultaneously taking account of all controlled variables that are relevant to the control, with an optimum control behavior being obtained, which also includes, in particular, a rapidly proceeding control.

In the method according to the invention, advantageously the state intermediate circuit energy values of the power semiconductor valve branches of the positive-side and of the negative-side three-phase voltage source of the converter are respectively individually detected; the parameters of a signal model of the intermediate energy values are calculated by means of a respective parameter estimator of the estimator unit, and the parameters of the positive-side and of the negative-side power semiconductor valve branches that respectively describe a DC component are respectively individually processed further to form the state intermediate circuit energy values.

Parameter estimators with a recursive algorithm are preferably used. Such algorithms include the recursive least squares algorithm, the recursive extended least squares algorithm, the recursive method of instrumental variables, the recursive prediction error method and the recursive maximum likelihood method or algorithm.

It is furthermore considered to be advantageous if, for determining the DC component of the intermediate circuit energy values, as estimator a parameter estimator with an oscillation model w(t) for the intermediate circuit energy values $w(t)=A_0+A_{k1}*\cos(k\omega t)+A_{k2}*\sin(k\omega t)$ for k=1 to n is used, in which $A_0$ indicates the DC component of the intermediate circuit energy values and $A_{k1}$ and $A_{k2}$ indicate further parameters of the oscillation model and $\omega$ indicates the angular frequency of an AC voltage power supply system connected to the converter.

The essential advantage of this configuration of the method according to the invention is that in this method the DC component of the intermediate circuit energy values can be determined rapidly on account of the use of the least squares estimator, which results in a good control behavior of the converter overall. This is because the DC component is required for controlling the intermediate circuit energy and for balancing the branches of the converter. If said DC component is determined exactly and rapidly, then as a result the control behavior of the converter overall is also good. If the control of the converter is effected digitally, which is preferred, then the invention makes it possible to achieve the effect that the DC component is respectively available at the present sampling incident or is even available after having already been estimated in advance for the following sampling point.

The DC component of the intermediate circuit energy values can be determined particularly rapidly if as estimator a parameter estimator with an oscillation model w(t) for the intermediate circuit energy values $w(t)=A_0+A_{11}*\cos(\omega t)+A_{12}*\sin(\omega t)+A_{21}*\cos(2\omega t)+A_{22}*\sin(2\omega t)$ is used, in which $A_0$ indicates the DC component of the intermediate circuit energy values and $A_{11}$ and $A_{22}$ indicate further parameters of the oscillation model and $\omega$ indicates the angular frequency of an AC voltage power supply system connected to the converter.

Parameters of different types can be estimated in the method according to the invention. In this case, it is advantageous for obtaining a high accuracy if an oscillation model with time-dependent parameters $A_0(t)$ to $A_{22}(t)$ is used.

In order to obtain an estimation that can be carried out relatively simply, it is furthermore advantageous if the time dependence of the parameters is predefined by a linear function or an exponential function.

Particularly simply, but possibly with a greater inaccuracy being accepted, the method according to the invention can be carried out with an oscillation model with temporally constant parameters $A_0$ to $A_{22}$. If the model corresponds well to the actual signal, the method operates accurately even with the simple model.

In the context of the invention, the state variables can comprise not only pure current values but also voltages, in particular actuating voltages, or the like or other variables such as the temperature of specific components. In this case, the desired variables always correspond to the state variables since a comparison, that is to say formation of the difference between these variables, would not be possible otherwise.

The method according to the invention can be carried out particularly advantageously if the converter used is a multi-level converter having power semiconductor valve branches connected to one another to form a bridge circuit, wherein each power semiconductor valve branch consists of a series circuit formed by submodules and each submodule comprises a circuit formed by power semiconductors and also a capacitor unit arranged in parallel therewith.

The invention is also based on the object of developing an arrangement for controlling a converter such as is evident from the international application discussed in the introduction, or generally of a self-commutated converter, to an extent such that the arrangement has a clear control structure and exhibits fast control in conjunction with good stability of the control.

In order to achieve this object, the invention proceeds from an arrangement for controlling a converter having a bridge circuit formed by phase module branches each having a series circuit formed by submodules each having a semiconductor circuit with a connected capacitor, comprising a control unit connected by its input to the measurement value output of the converter, said control unit generating actuating voltage values u(k) at its output, and control electronics disposed downstream of the control unit, said control electronics providing control signals in a manner dependent on the actuating voltage values u(k) and transmitting said control signals to the power semiconductors of the converter. According to the invention, an observer unit is situated between the measurement value output of the converter and the input of the control unit (16), said observer unit calculating the actual state values $\hat{x}(k)$, proceeding from the actuating voltage values u(k) and taking account of measured current values x(k), an estimator unit is situated between the measurement value output of the converter and the input of the control unit, said estimator unit calculating actual state intermediate circuit energy values $\hat{w}(k)$, taking account of measured intermediate circuit energy values w(k) of the positive-side and of the negative-side three-phase voltage source of the converter, wherein the observer unit and the estimator unit model the converter, such that the calculated actual state current values $\hat{x}(k)$ and actual state intermediate circuit energy values in the steady state correspond to the fault-free current and intermediate circuit energy values, and the fault-free current and intermediate circuit energy values $\hat{x}(k), \hat{w}(k)$ are supplied to a control unit embodied as a periodic controller having a periodically time-variant gain.

Advantages of this arrangement are primarily that all controlled variables that are relevant to the control are taken into account simultaneously, whilst obtaining an optimum control behavior with rapidly proceeding control.

The arrangement is particularly advantageous when an observer unit having a periodically time-variant system model is used, which model, proceeding from the general state equation $\dot{x}=A\cdot x+B\cdot u$ with x as state variable, $\dot{x}$ as time derivative of the state variable, A as system matrix, B as input matrix and u as input variable, has a time-invariant system matrix $A_{PLTV}$ and a time-variant input matrix $B_{PLTV}(t)$ with $$x_{PLTV} = \begin{pmatrix} \underline{x} \\ \underline{x}_{\alpha\beta} \\ \underline{x}_{dq}-1 \\ \underline{w}_{\alpha\beta} \\ \underline{w}_{dq}-1 \\ \underline{w} \end{pmatrix},$$

where x denotes the measured, Park-transformed current, $x_{\alpha\beta}$ denotes the alpha-beta-transformed current and $x_{dq}-1$ denotes the doubly Park-inverse-transformed measured current (negative phase sequence system), $w_{\alpha\beta}$ denotes the alpha-beta-transformed, measured intermediate circuit energy value sums of positive-side and negative-side three-phase voltage sources and $w_{dq}^{-1}$ denotes the alpha-beta-transformed, measured intermediate circuit energy value differences between positive-side and negative-side three-phase voltage sources, and w denotes the measured intermediate circuit energy values of the entire converter.

In a further solution for achieving the object indicated above, according to the invention, an observer unit is situated between the measurement value output of the converter and the input of the control unit, said observer unit calculating the actual state values $\hat{x}(k)$, proceeding from the actuating voltage values u(k) and taking account of measured current values x(k); an estimator unit is situated between the measurement value output of the converter and the input of the control unit, said estimator unit calculating actual state intermediate circuit energy values $\hat{w}(k)$, taking account of measured intermediate circuit energy values w(k) of the positive-side and of the negative-side three-phase voltage source of the converter, wherein the observer unit and the estimator unit model the converter, such that the calculated actual state current values $\hat{x}(k)$ and state intermediate circuit energy values of the total energy of the converter and the difference in the intermediate circuit energy values w(k) of the positive-side and of the negative-side three-phase voltage source of the converter in the steady state correspond to the fault-free current and intermediate circuit energy values, and the fault-free current $\hat{x}(k)$ and intermediate circuit energy values $\hat{x}(k)$ are fed to a control unit embodied as a periodic controller having a periodically time-variant gain.

Advantages of this arrangement are likewise primarily that all controlled variables that are relevant to the control are taken into account simultaneously, whilst obtaining an optimum control behavior with rapidly proceeding control.

Particularly advantageously, in the arrangement according to the invention, a periodic feedforward control unit connected on the output side to a summing circuit disposed upstream of the periodic controller has a period corresponding to the period of the AC current.

Furthermore, it is considered to be advantageous if the periodic controller is designed such that its periodically time-variant gain is effected by means of periodic changeover of its controller matrices.

Preferably, the observer unit of the arrangement according to the invention is equipped such that it calculates actual state values $\hat{x}(k)$ proceeding from the actuating voltage values u(k) and state measurement values $y_d(k)$ taking account of disturbance effects and/or delay effects in such a way that the actual state values $\hat{x}(k)$ correspond to current measurement values that are freed of disturbance effects and/or undisturbed in the steady state.

In the arrangement according to the invention, preferably an estimator unit that simulates the signal model of intermediate circuit energy values (w(k)) is connected to the output of the converter, and the observer unit and the estimator unit are connected on the output side to actual inputs of the control unit.

In one particular advantageous embodiment of the arrangement according to the invention, the converter is a multilevel converter having power semiconductor valve branches connected to one another to form a bridge circuit, wherein each power semiconductor valve branch consists of a series circuit formed by submodules and each submodule comprises a circuit formed by power semiconductors and also a capacitor unit arranged in parallel therewith.

The invention and advantages thereof are described below on the basis of exemplary embodiments of the invention with reference to the figures of the drawing, wherein identical reference signs refer to identical components, and wherein

DESCRIPTION OF THE INVENTION

Figure 1:
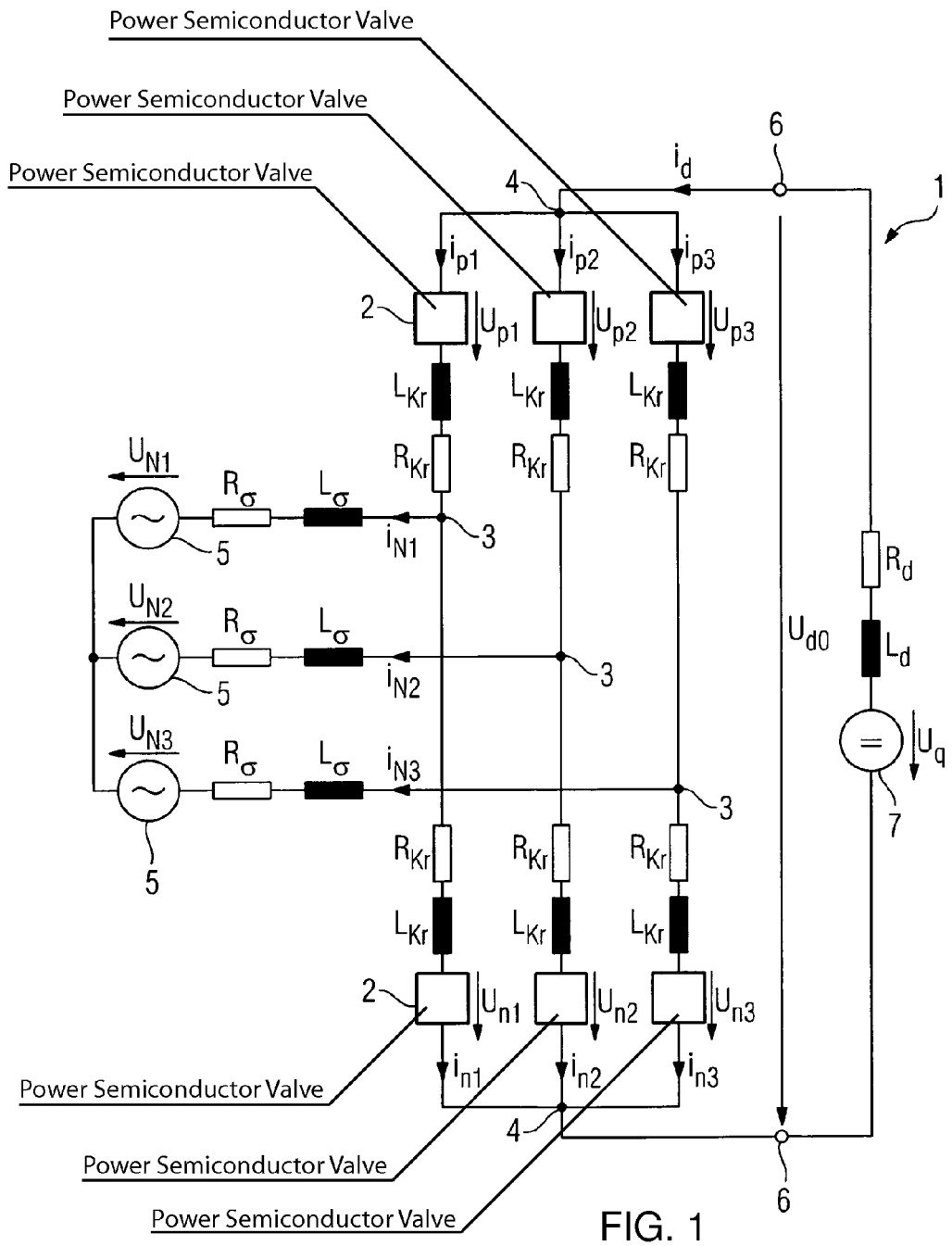
FIGS. 1 to 3 show a schematic illustration of an exemplary converter which is controlled by the method according to the invention.

FIG. 1 schematically shows the construction of a converter 1 to be controlled, said converter being provided for connection to an AC power supply system that is not illustrated pictorially in FIG. 1. The converter 1 has six power semiconductor valve branches 2 interconnected with one another to form a six-pulse bridge circuit. In this case, each power semiconductor valve branch 2 extends between an AC voltage connection 3 and a DC voltage connection 4. Each AC voltage connection 3 is connected to a secondary winding 5 of a transformer (not completely illustrated pictorially), wherein the secondary windings 5 are interconnected with one another to form a star. The voltages $U_{N1}$, $U_{N2}$ and $U_{N3}$ are dropped across the secondary windings 5. Furthermore, in each phase an ohmic resistor R, and an inductance $L_o$, are arranged between the AC voltage connection 3 and the secondary winding 5, wherein the power supply system currents $i_{N1}$, $i_{N2}$ and $i_{N3}$ flow. Furthermore, inductances $L_{Kr}$ and ohmic resistors $R_{Kr}$ are arranged between each AC voltage connection and the associated phase module or power semiconductor valve branch 2. The current flowing through the respective power semiconductor valve branch 2 is designated by $i_{p1}$, $i_{p2}$, $i_{p3}$, $i_{n1}$, $i_{n2}$ and $i_{n3}$. The voltage dropped overall across the power semiconductor valve branches 2 is designated by $u_{p1}$, $u_{p2}$, $u_{p3}$ and $u_{n1}$, $u_{n2}$ and $u_{n3}$. The DC voltage connections 4 are part of a DC voltage circuit 6 in which a DC current $i_d$ flows.

The positive pole of the DC voltage circuit 6, said positive pole being illustrated at the top in FIG. 1, is connected to the negative pole, illustrated at the bottom, via an ohmic resistor $R_D$, an inductance $L_D$ and also a schematically indicated voltage source 7. The voltage dropped between the positive pole and the negative pole of the DC voltage circuit 6 is $U_{d0}$, and the voltage dropped across the voltage source 7 is $U_q$.

Figure 2:
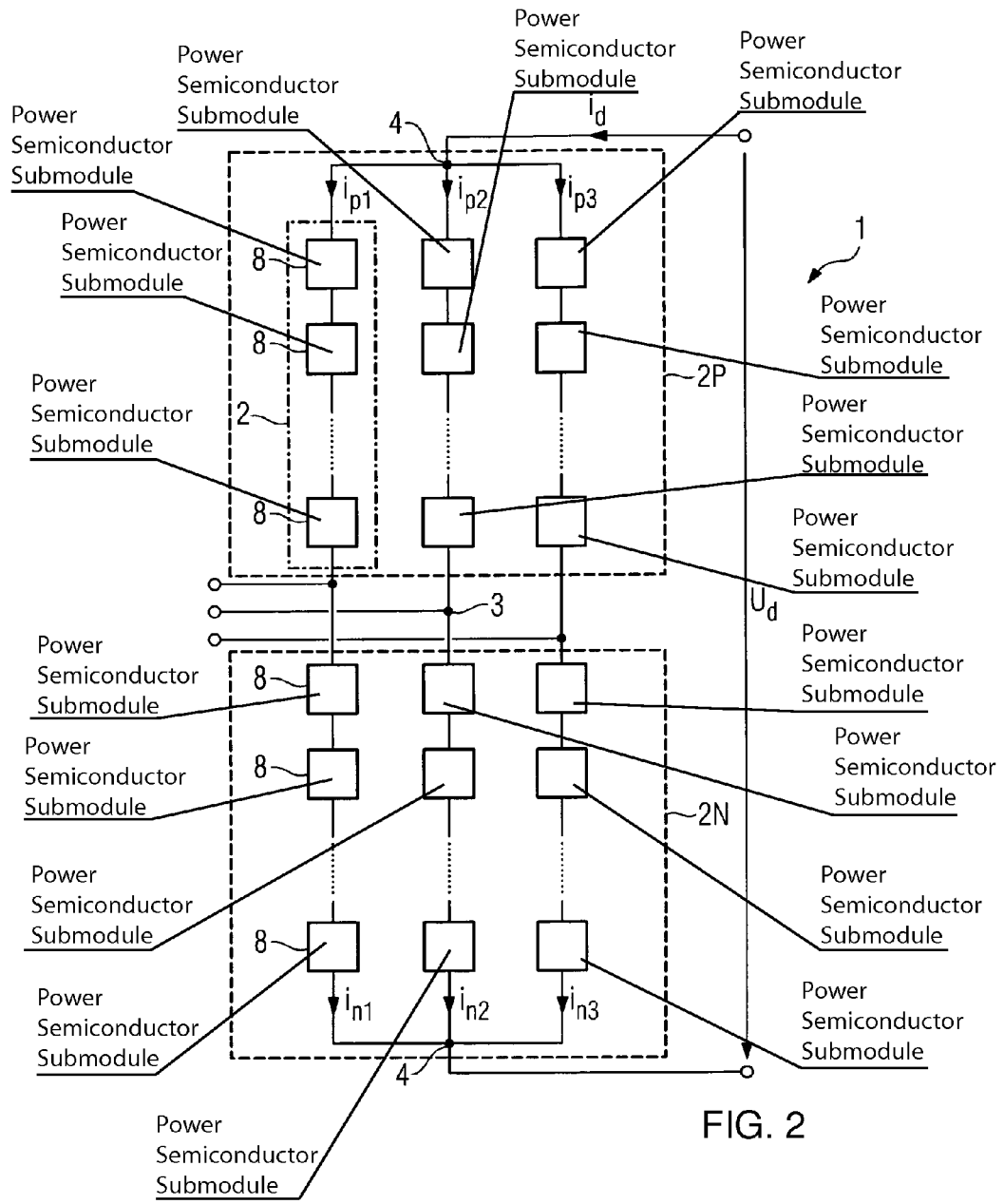
Figure 3:
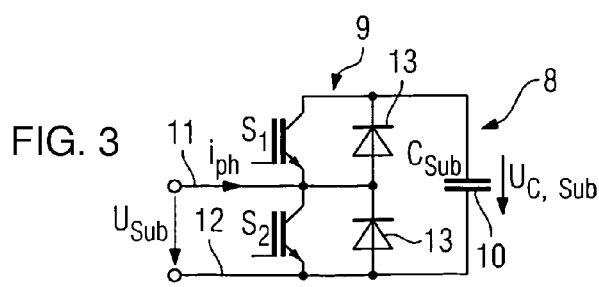

The construction of the power semiconductor valve branches 2 is illustrated more precisely in FIG. 2. It can be discerned that each power semiconductor valve branch 2 has a series circuit formed by submodules 8, the construction of which is illustrated in FIG. 3. It can be discerned that each submodule 8 has a power semiconductor circuit 9, which is connected to a submodule capacitor 10, such that either the voltage $U_{C,Sub}$ dropped across the submodule capacitor 10 or else a zero voltage can be generated at output terminals 11 and 12 of each submodule 8. For this purpose, the power semiconductor circuit 9 has two turn-off power semiconductors S1 and S2, which are designed for high voltages and are realized, for example, as IGBT, GTO or the like. A freewheeling diode 13 is connected in parallel in an opposite sense with respect to each turn-off power semiconductor S1 and S2, respectively.

Figure 4:
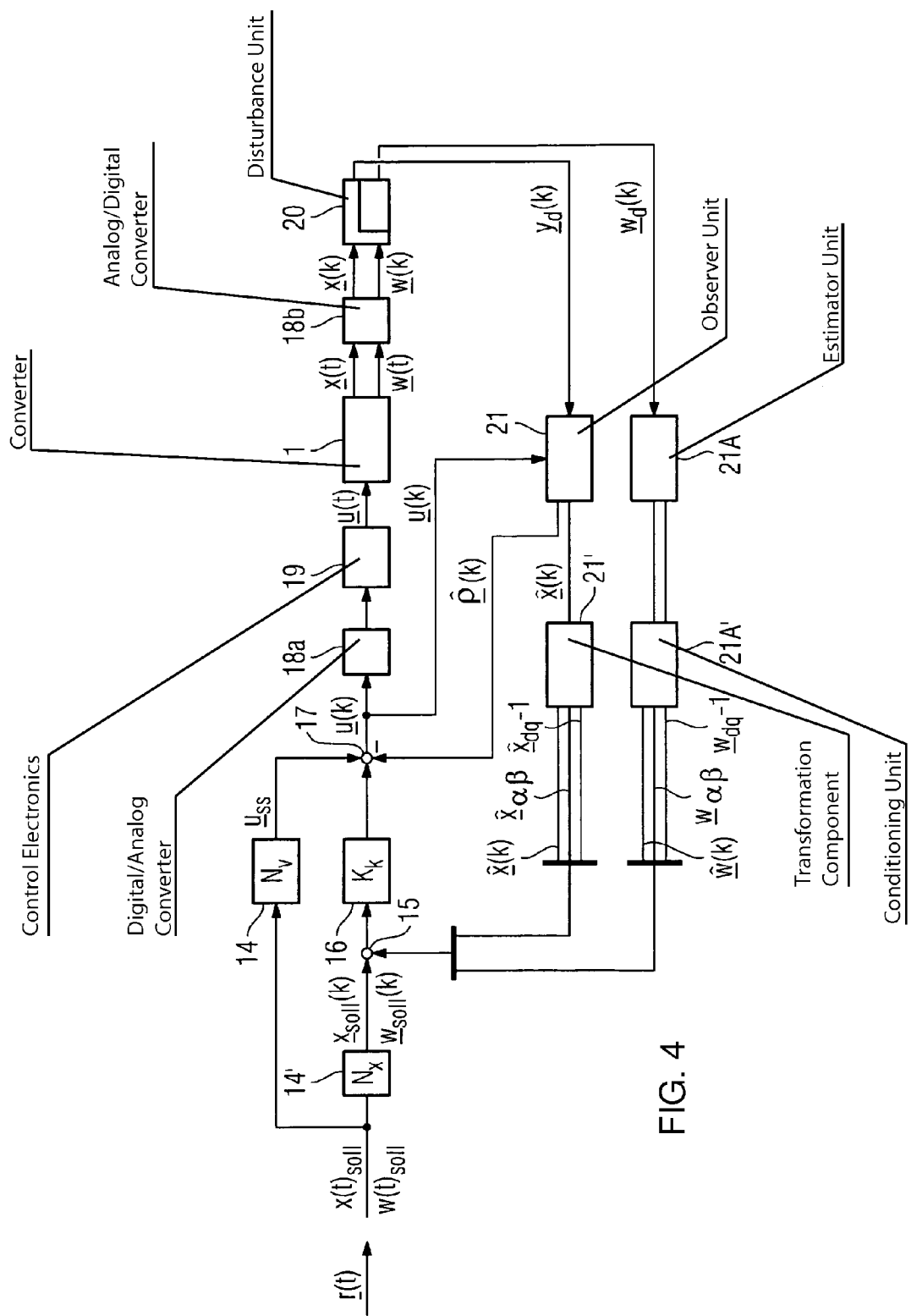
FIG. 4 shows an exemplary embodiment of an arrangement for carrying out the method according to the invention in an illustration of the principles.

FIG. 4 shows an exemplary embodiment of the method according to the invention for controlling a converter in accordance with FIGS. 1 to 3. As is generally customary in closed-loop control systems, here as well desired values are compared with actual values, or in other words the difference between a desired value and an actual value is formed, wherein the control difference obtained in this way is subsequently fed to a control unit 16, to which a feedforward control unit 14 and a mapping unit 14' are assigned in the exemplary embodiments illustrated. The controlled variables of the converter shown in FIG. 1 are the currents flowing in the converter 1. In this case, however, it suffices to consider just five currents, since the remaining currents shown in FIG. 1 can be calculated from the known five currents.

All current control variables are combined according to the invention in a state vector $\hat{x}(k)$; the same correspondingly applies with regard to intermediate circuit energy control variables, which are combined in a state vector $\hat{w}(k)$. The same correspondingly applies to the desired variables r(t), which are predefined with regard to the currents with the desired values $x_{desired}(t)$ and regarding the intermediate circuit energies with the desired values w(t). The desired values $x_{desired}(t)$ are firstly fed to the feedforward control unit 14, which maps the desired values $x_{desired}(t)$ onto steady-state actuating voltages $u_{SS}(k)$. In the mapping unit 14', desired state values $w_{SS}(k)$ are formed from the desired intermediate circuit energy values $w_{desired}(t)$. With the aid of the addition unit 15, the difference between the desired values $x_{desired}(k)$ and $w_{desired}(k)$ and actual state current values $\hat{x}(k)$ and actual state intermediate circuit energy values $\hat{w}(k)$ is formed, wherein control difference values are generated, which are fed to the control unit 16. On the output side, the control unit 16 provides actuating voltages for power semiconductor valve branches 2 of the converter 1 in accordance with FIG. 1. The steady-state actuating voltages $u_{ss}(k)$ are added to said actuating voltages by means of an adder 17 and an actual disturbance vector $\rho\hat{\rho}(k)$, is subtracted, wherein the actuating voltage vector u(k) is generated in a sampling step k. The actuating voltages of the actuating voltage vector u(k) are then converted into analog actuating voltages u(t) with the aid of a digital/analog converter 18a and are finally fed to control electronics 19, which generate control signals for the power semiconductors S1, S2 of each power semiconductor valve branch 2 in a manner dependent on the respective actuating voltage u(k) (cf. FIGS. 1 and 3). The control signals are finally fed to the converter 1, whereupon the desired currents and intermediate circuit energies are established, which are in turn symbolized by the state vector x(t) and w(t), respectively. The converter currents are measured by means of sensors (not illustrated), for example with the aid of current converters, wherein the analog/digital converter 18b samples the measured signal of the respective current converter and digitizes the samples obtained in this case, such that the state vectors x(k) and w(k) arise at the outputs of the analog/digital converter 18b at the sampling instant k, said state vectors comprising, for example, five different currents and intermediate circuit energies, such that the converter 1 is fully characterized.

FIG. 4 furthermore shows a disturbance unit 20, which in the form of an equivalent circuit diagram takes account of the fact that the detected current measurement values are beset by disturbances. Therefore, $y_d(k)$ represents a state vector with disturbed current measurement values. This state vector $y_d(k)$ is fed to an observer unit 21, which receives the actuating voltages u(k) as second input signal. The observer unit 21, which will be discussed in more specific detail later, predicts, with the aid of a mathematical model of the converter 1 that takes account of disturbances, undisturbed actual current values $\hat{x}(k)$ and provides the latter on the output side. The undisturbed actual current values $\hat{x}(k)$ are then made available to the control unit 16 via a transformation component 21' disposed downstream of the observer unit 21.

The observer unit 21 furthermore generates at its output actual disturbance values $\mu\hat{\rho}(k)$, which are processed in the adder 17 in such a way that they are subtracted.

Figure 5:
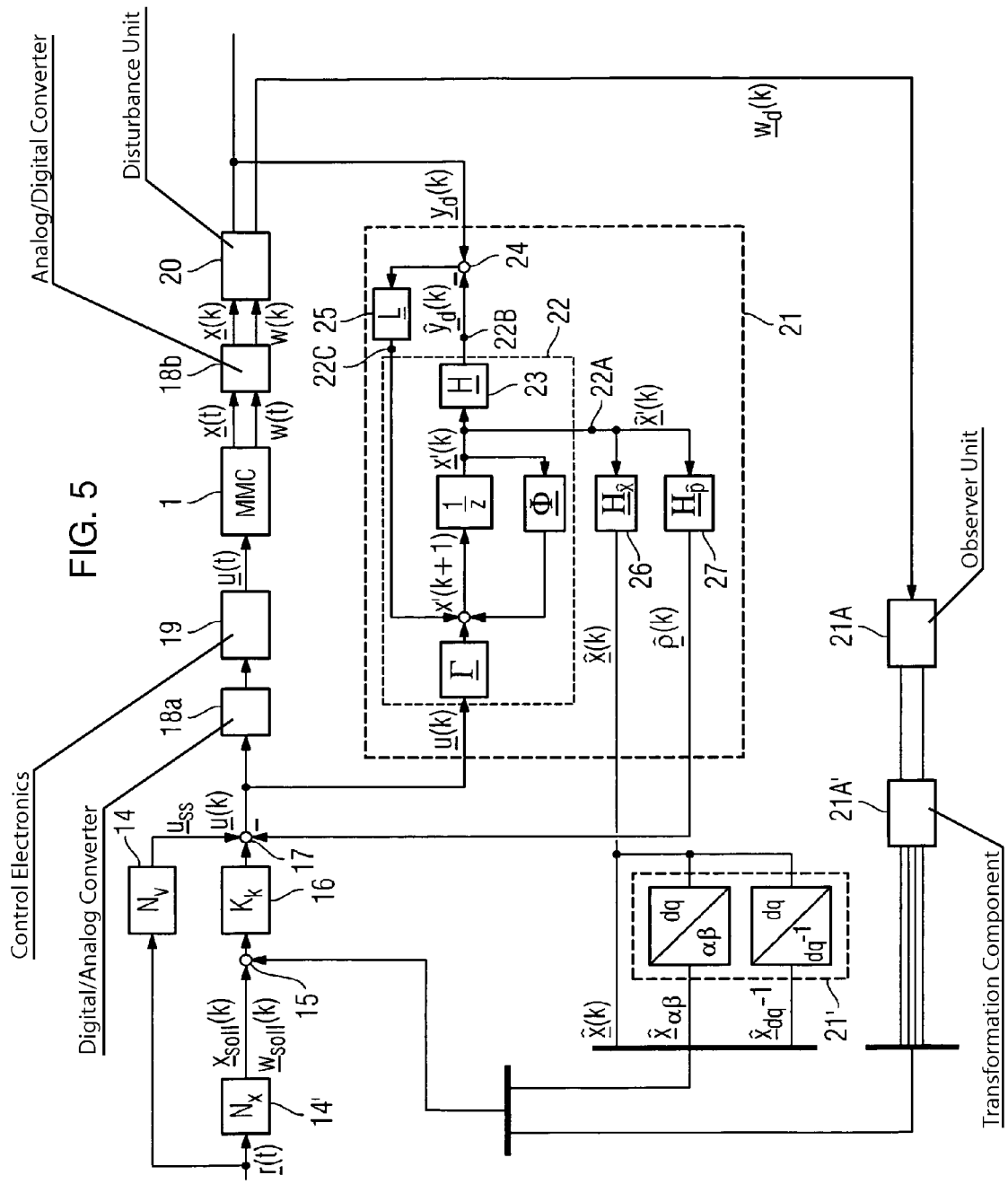
FIG. 5 shows the same exemplary embodiment in a detailed illustration.

FIG. 5 illustrates the exemplary embodiment in accordance with FIG. 4 in a detailed fashion.

It can be discerned that the observer unit 21 has a model unit 22, with the aid of which the converter 1 is modeled. At an output 22A of the model unit 22, a vector $\hat{x}'(k)$ is provided, which comprises both the undisturbed actual current values $\hat{x}(k)$, and current model measurement values beset by disturbances. At a further output 22B of the model unit 22, current model measurement values $\hat{y}_d(k)$ occur, which correspond to really measured current measurement values $y_d(k)$. In this case, the unit 23 cuts out from the vector $\hat{x}'(k)$ only the disturbed current model measurement values $\hat{y}_d(k)$. Said current model measurement values $\hat{y}_d(k)$ will then be subtracted from the really measured measurement values $y_d(k)$ beset by disturbances by means of an adder 24. The model measurement value deviation obtained in this way is finally fed to a feedback unit 25, which applies a gain or feedback matrix L to the vector of the model measurement value deviation. The model measurement value deviations are thereby amplified. The amplified model measurement value deviations are finally fed to the model unit 22 at an input 22C, wherein the feedback is effected such that $\hat{y}_d(k)$ and $y_d(k)$ converge. In other words, the modeling of the converter is effected such that the model measurement value deviation becomes minimal.

For cutting out the undelayed actual current values $\hat{x}(k)$, from the state vector $\hat{x}'(k)$, also comprising delayed measurement values, as output of the model unit 22, a unit 26 is provided. The output of the unit 26 $\hat{x}'(k)$ is fed to the adder 15 and thus taken as a basis for the further control.

Actual disturbance values $\hat{\rho}(k)$ are also cut out from the state vector $\hat{x}'(k)$ by means of a further unit 27 and are fed to the adder 17 such that a subtraction takes place there.

The mathematical model used is discussed below. For modeling disturbances, the state vector, that is to say the vector with the undisturbed actual current values, has to be extended by the disturbances.

In this case, firstly the conventional state equation is extended by a disturbance v which acts on the input in the system via the input matrix B. The following holds true:

$$\dot{x}=Ax+Bu+Bv \quad (1)$$

in which x denotes the state variable and A denotes the system matrix.

In addition, the system is intended to follow exactly one constant desired variable r in the steady state (cf. FIG. 5). For the control error e, the following equation $$e=Hx-r \quad (2)$$

can then be established, in which H denotes the output matrix of the system with discretized consideration. In order to be able to design an observer for the disturbance variables, a mathematical model of the disturbance is necessary. A constant disturbance v can be described without problems by equation (3) and the desired variable r can be described by (4).

$$\dot{v}=0 \tag{3}$$

$$\dot{r}=0 \tag{4}$$

In this case, equation (3) in terms of its statement is identical to the indication of the system matrices:

$$A=0 \; B=0 \; C=1 \tag{5}$$

If v and r then fulfill the same equation as in the above case, it is possible to find for the system an equivalent input signal ρ which likewise fulfills the equation. This results in the following:

$$\dot{x}=Ax+B(u+\rho) \tag{6}$$

and $$e=Hx \tag{7}$$

The state vector x is then extended by ρ to form $$x_\rho = \begin{pmatrix} \rho \\ x \end{pmatrix} \tag{8}$$

wherein the following holds true for ρ:

$$\dot{\rho}=0 \tag{9}$$

The situation is more complicated if a disturbance variable model for the positive, negative and zero phase sequence system is intended to be designed for the model unit 22 in order to correct DC current asymmetries or DC components. As is known, these DC disturbance variables appear as disturbances having single and double power supply system frequency after a Park transformation.

Therefore, a corresponding model is required for observing these disturbances. As described further above, the same model holds true for the modeling of the equivalent input signal ρ. Then, on the one hand, disturbances of this signal form in the steady state are exactly corrected; on the other hand, desired values of this signal form in the steady state are exactly adjusted by control. The oscillation model for the fundamental angular frequency $\omega_0$ reads as follows in the state space:

$$A_{\omega 0} = \begin{pmatrix} 0 & 1 \\ -\omega_0^2 & 0 \end{pmatrix}, B_{\omega 0} = \begin{pmatrix} 0 \\ 0 \end{pmatrix}, C_{\omega 0} = (1 \;\; 0) \tag{10}$$

The input matrix $B_{\omega 0}$ is zero because the disturbance cannot be influenced, that is to say is not controllable. A model for the observer design can then be established:

$$\dot{x}_\rho = A_\rho x_\rho + B_\rho u, \; e = C x_\rho \tag{11}$$

The following holds true in this case:

$$x_\rho = \begin{pmatrix} \rho \\ x \end{pmatrix}, \rho = \begin{pmatrix} \rho \\ \dot{\rho} \end{pmatrix} \tag{12}$$

The system matrices are then established, which contain the system and disturbance variable model:

$$A_\rho = \begin{pmatrix} 0 & 1 & \underline{0} \\ -\omega_0^2 & 0 & \underline{0} \\ \underline{B} & \underline{0} & \underline{A} \end{pmatrix}, \tag{13}$$

$$B_\rho = \begin{pmatrix} 0 \\ 0 \\ \underline{B} \end{pmatrix},$$

$$\underline{C}_\rho = (0 \;\; 0 \;\; \underline{C})$$

The model is then extended to all frequency ranges. The following is assumed for ρ:

$$\rho = \begin{pmatrix} \overline{\rho} \\ \rho_{\omega_0} \\ \rho_{2\omega_0} \\ \dot{\rho}_{\omega_0} \\ \dot{\rho}_{2\omega_0} \end{pmatrix} \tag{14}$$

The following then holds true for the extended system model matrices:

$$A_\rho = \begin{pmatrix} 0 & 0 & 0 & 0 & 0 & \underline{0} \\ 0 & 0 & 0 & 1 & 0 & \underline{0} \\ 0 & 0 & 0 & 0 & 1 & \underline{0} \\ 0 & -\omega_0^2 & 0 & 0 & 0 & \underline{0} \\ 0 & 0 & -4\omega_0^2 & 0 & 0 & \underline{0} \\ \underline{B} & \underline{B} & \underline{B} & \underline{0} & \underline{0} & \underline{A} \end{pmatrix}, \tag{15}$$

$$B_\rho = \begin{pmatrix} 0 \\ 0 \\ 0 \\ 0 \\ 0 \\ \underline{B} \end{pmatrix},$$

$$\underline{C}_\rho = (0 \;\; 0 \;\; 0 \;\; 0 \;\; 0 \;\; \underline{C})$$

The model from equation (15) can be extended for the converter under discussion here. Firstly, in ρ all five input variables are combined:

$$\underline{\rho} = \begin{pmatrix} \overline{\underline{\rho}} \\ \underline{\rho}_{\omega_0} \\ \underline{\rho}_{2\omega_0} \\ \underline{\dot{\rho}}_{\omega_0} \\ \underline{\dot{\rho}}_{2\omega_0} \end{pmatrix} \tag{16}$$

The elements of ρ then respectively again contain five elements, representative of the disturbances on the five manipulated variables. The system model becomes—with "I" as unit matrix:

$$A_\rho = \begin{pmatrix} 0 & 0 & 0 & 0 & 0 & 0 \\ 0 & 0 & 0 & I & 0 & 0 \\ 0 & 0 & 0 & 0 & I & 0 \\ 0 & \omega_0 & 0 & 0 & 0 & 0 \\ 0 & 0 & \omega_1 & 0 & 0 & 0 \\ \underline{B} & \underline{B} & \underline{B} & 0 & 0 & A \end{pmatrix}, \quad (17)$$

$$B_\rho = \begin{pmatrix} 0 \\ 0 \\ 0 \\ 0 \\ 0 \\ 0 \\ B \end{pmatrix},$$

$$\underline{C}_\rho = (0 \quad 0 \quad 0 \quad 0 \quad 0 \quad \underline{C})$$

wherein $$\omega_0 = -\omega_0^2 \cdot I \text{ and } \omega_1 = -4\omega_0^2 \cdot I \quad (18)$$

According to the same principle, besides positive and negative phase sequence systems, harmonics can also be compensated for by extending the disturbance model, wherein here by way of example $$\omega_2 = -16 \cdot \omega_0^2 \cdot I, \; \omega_3 = -25\omega_0^2 \cdot I \text{ and } \omega_4 = -36\omega_0^2 \cdot I \quad (19)$$

are considered.

$$A_\rho = \begin{pmatrix} 0 & 0 & \cdots & 0 & 0 & \cdots & 0 & 0 \\ 0 & 0 & \cdots & 0 & I & \cdots & 0 & 0 \\ 0 & 0 & \cdots & 0 & 0 & \ddots & 0 & 0 \\ 0 & 0 & \cdots & 0 & 0 & \cdots & I & 0 \\ 0 & \omega_0 & \cdots & 0 & 0 & \cdots & 0 & 0 \\ 0 & 0 & \ddots & 0 & 0 & \ddots & 0 & 0 \\ 0 & 0 & \cdots & \omega_4 & 0 & \cdots & 0 & 0 \\ \underline{B} & \underline{B} & \cdots & \underline{B} & 0 & \cdots & 0 & A \end{pmatrix} \quad (20)$$

This model can be discretized according to known methods, but this will not be presented here in detail, thus affording a system $\Phi_\rho$, $\Gamma_\rho$, $H_\rho$ with time-discrete model parameters that are accessible to practical processing in a data processing system. In this case, the time-discrete model parameter $\Phi_\rho$ corresponds to the continuous system parameter B, the time-discrete input matrix $\Gamma_\rho$ corresponds to the input matrix B, and the time-discrete output matrix $H_\rho$ corresponds to the output matrix C.

In order to explain the method developed according to the invention with additional correction of delays, reference is once again made to FIG. 4 and firstly a situation in which solely delays are intended to be corrected; in this case, the block 20 symbolizes delays that arise unavoidably between the actual measurement instant of the currents of the converter 1 and the further processing and transmission of the current measurement values. These delays are designated as measurement delays or measurement dead times. $y_d(k)$ here then therefore represents a state vector with delayed current measurement values. The delayed current measurement values $y_d(k)$ are fed to the observer unit 21, which receives the actuating voltages u(k) as second input signal. The observer unit 21, which will be discussed in even more specific detail later, predicts, with the aid of a mathematical model for the converter 1 that takes account of both actuating delays and the measurement delays, the undelayed actual current values $\hat{x}(k)$ and provides the latter on the output side. The undelayed actual current values $\hat{x}(k)$ are then made available to the control unit 16.

Referring to FIG. 5, it is furthermore evident that the model unit 22 provides a vector $\hat{x}'(k)$ comprising both the undelayed actual current values $\hat{x}(k)$ and current model measurement values which correspond to the actual current values but are beset with delays $\hat{y}_d(k)$. In other words, current model measurement values $\hat{y}_d(k)$ correspond to really measured current measurement values $y_d(k)$. The unit 23 cuts out from the output of the model unit 22 only the delayed current model measurement values $\hat{y}_d(k)$, wherein the current model measurement values $\hat{y}_d(k)$ are subtracted from the really measured measurement values $y_d(k)$ beset by delays by means of the adder 24. The model measurement value deviation obtained in this way is finally fed to the feedback unit 25, which applies a gain or feedback matrix L to the vector of the model measurement value deviation. The model measurement value deviations are thereby amplified. The amplified model measurement value deviations are finally fed to the model unit 22 as an input, wherein the feedback is effected such that $\hat{y}_d(k)$ and $y_d(k)$ converge. In other words, the modeling of the converter is effected such that the model measurement value deviation becomes minimal.

For cutting out the undelayed actual current values $\hat{x}(k)$ from the state vector $\hat{x}'(k)$, also comprising delayed measurement values, as output of the model unit 22, the unit 26 is provided. The output of the unit 26 $\hat{x}'(k)$ is fed to the adder 15 and thus taken as a basis for the further control.

The mathematical model used is discussed below. For modeling measurement delays, the state vector, that is to say the vector with the undelayed actual current values, has to be extended by the delayed measurement values.

$$\hat{x}'(k) = \begin{pmatrix} \hat{x}(k) \\ \hat{y}_{1d}(k) \\ \vdots \\ \hat{y}_{nd}(k) \end{pmatrix} \quad (21)$$

If $\hat{y}_d(k)$ is a vector of the delayed measurement variables, then the following holds true for the delay of one sampling step:

$$y_{1d}(k+1) = y(k) \quad (22)$$

In the case of delays of more than one sampling step, it furthermore holds true that $$y_{2d}(k+1) = y_{1d}(k) \quad (23)$$

and $$y_d(k+1) = y_{nd}(k) \quad (24)$$

The following general model can be derived therefrom:

$$x(k+1) = \Phi_d x(k) + \Gamma_d u(k)$$

$$y_d(k) = H_d x(k) \quad (25)$$

Furthermore, the following hold true—with "I" once again as unit matrix:

$$\Phi_d = \begin{pmatrix} \Phi & 0 & \ldots & 0 \\ H & 0 & \ldots & 0 \\ 0 & I & \ldots & 0 \\ \vdots & \ldots & \ddots & 0 \end{pmatrix} \quad (26)$$

$$\Gamma_d = \begin{pmatrix} \Gamma \\ 0 \\ \vdots \\ 0 \end{pmatrix}$$

$$H_d = (0 \quad 0 \quad \ldots \quad I)$$

Consequently, a system model is available which can be used to design the observer unit 21.

The model unit 22 of the observer unit 21 uses, for modeling the converter 2, the abovementioned system model in accordance with $$\hat{x}'(k+1) = \Phi \hat{x}'(k) + \Gamma u(k) \quad (27)$$

The observation error can then be defined as $$\tilde{x} = x - \hat{x}' \quad (28)$$

In order that the current model measurement values also converge toward the measured real current measurement values, a feedback matrix L is introduced, thus resulting in the following equation:

$$\hat{x}'(k+1) = \Phi \hat{x}'(k) + \Gamma u(k) + L(y(k) - H\hat{x}'(k)) \quad (29)$$

For designing the feedback matrix it is necessary to consider the error equation $$\tilde{x}(k+1) = (\Phi - LH)\tilde{x}(k) \quad (30)$$

wherein the dynamic range ($\Phi-LH$) is chosen such that the current model measurement values $\hat{y}_d(k)$ also converge toward the measured measurement values $y_d(k)$, to be precise more rapidly than the system dynamic range.

For modeling actuating delays generated by the control electronics 19, the following system is applied:

$$x(k+1) = \Phi x(k) + \Gamma_0 u(k-(l-1)) + \Gamma_1 u(k-1)$$

The following holds true for the actuating delay $\tau$ $$\tau = (l-1) \cdot T + \tau'$$

The system matrices read as follows:

$$\Phi = e^{AT} \quad (33)$$

$$\Gamma_0 = \int_0^{T-\tau'} e^{At} ds \underline{B}$$

$$\Gamma_1 = e^{A(T-\tau')} \int_0^{\tau'} e^{Ax} ds \underline{B}$$

$$\begin{pmatrix} x(k+1) \\ \underline{u}(k-(l-1)) \\ \underline{u}(k-(l-2)) \\ \underline{u}(k-1) \\ \underline{u}(k) \end{pmatrix} = \begin{pmatrix} \Phi & \Gamma_1 & \Gamma_0 & 0 & 0 \\ 0 & 0 & I & 0 & 0 \\ 0 & 0 & 0 & I & 0 \\ 0 & 0 & 0 & 0 & I \\ 0 & 0 & 0 & 0 & 0 \end{pmatrix} \begin{pmatrix} x(k) \\ \underline{u}(k-1) \\ \underline{u}(k-(l-1)) \\ \underline{u}(k-2) \\ \underline{u}(k-1) \end{pmatrix} + \begin{pmatrix} 0 \\ 0 \\ 0 \\ 0 \\ I \end{pmatrix} \underline{u}(k)$$

The converter can be completely modeled with measurement and actuating delays by combining the modelings shown above. The following arises as a direct representation of the difference equation of the modeled system:

$$x_\tau^d(k+1) = \Phi_\tau^d x_\tau^d(k) + \Gamma_\tau^d u(k)$$

$$y_d(k) = H_\tau^d x_\tau^d(k)$$

The system matrices are established here by way of example for a measurement delay d in sampling steps and an actuating delay of $\tau = (l-1) \cdot T + \tau'$ wherein there are also actuating delays which are non-integral multiples of T.

$$\Phi_\tau^d = \begin{pmatrix} \Phi & 0 & 0 & \ldots & 0 & \Gamma_1 & \Gamma_0 & \ldots & 0 \\ H & 0 & 0 & \ldots & 0 & 0 & 0 & \ldots & 0 \\ 0 & I & 0 & \ldots & 0 & 0 & 0 & \ldots & 0 \\ 0 & 0 & I & \ldots & 0 & 0 & 0 & \ldots & 0 \\ \vdots & \vdots & \vdots & \ddots & \vdots & \vdots & \vdots & \ddots & \vdots \\ 0 & 0 & 0 & \ldots & I & 0 & 0 & \ldots & 0 \\ 0 & 0 & 0 & \ldots & 0 & 0 & I & \ldots & 0 \\ \vdots & \vdots & \vdots & \ldots & \vdots & \vdots & \vdots & \ddots & \vdots \\ 0 & 0 & 0 & \ldots & 0 & 0 & 0 & \ldots & I \\ 0 & 0 & 0 & \ldots & 0 & 0 & 0 & \ldots & 0 \end{pmatrix} \quad (35)$$

$$x_\tau^d = \begin{pmatrix} \hat{x}(k) \\ y(k) \\ y(k-1) \\ \vdots \\ y(k-d) \\ \underline{u}(k-l+1) \\ \vdots \\ \underline{u}(k-1) \\ \underline{u}(k) \end{pmatrix}$$

$$\Gamma_\tau^d = \begin{pmatrix} 0 \\ 0 \\ 0 \\ \vdots \\ 0 \\ 0 \\ \vdots \\ 0 \\ I \end{pmatrix} \quad (36)$$

$$H_\tau^d = (0 \quad 0 \quad 0 \quad \ldots \quad I \quad 0 \quad \ldots \quad 0)$$

For the multilevel converter in accordance with FIG. 1, l=2 and d=4 are assumed. The following matrices then arise:

$$\Phi_{MMC} = \begin{pmatrix} \Phi & 0 & 0 & 0 & 0 & \Gamma_1 & \Gamma_0 \\ H & 0 & 0 & 0 & 0 & 0 & 0 \\ 0 & I & 0 & 0 & 0 & 0 & 0 \\ 0 & 0 & I & 0 & 0 & 0 & 0 \\ 0 & 0 & 0 & I & 0 & 0 & 0 \\ 0 & 0 & 0 & 0 & 0 & 0 & I \\ 0 & 0 & 0 & 0 & 0 & 0 & 0 \end{pmatrix} \quad (37)$$

$$\hat{x}'_{MMC} = \begin{pmatrix} \hat{x}(k) \\ y(k) \\ y(k-1) \\ y(k-2) \\ y(k-3) \\ \underline{u}(k-1) \\ \underline{u}(k) \end{pmatrix}$$

-continued $$\Gamma_{MMC} = \begin{pmatrix} 0 \\ 0 \\ 0 \\ 0 \\ 0 \\ 0 \\ 0 \\ 1 \end{pmatrix}$$

$$H_{MMC} = (0 \ 0 \ 0 \ 0 \ 1 \ 0 \ 0)$$

With the modeling of the converter that is possible in this way, the undelayed actual current values can be calculated.

Assuming this, a system model is obtained which is used to compensate for disturbance variables and additionally measurement value delays by the two observer models described above being combined with one another, wherein the last row/column from the time-discrete model parameter $\Phi_\rho$—corresponding to system parameter $A_\rho$ in accordance with equations (13) and (15)—together with the first row/column from the time-discrete model parameter $\Phi_d$—cf. equation (26)—overlap.

If $\Phi_d^{\tau'}$ and $\Phi'_\rho$ are the matrices without the row/column mentioned, then the following compact notation can be chosen for the observation model $\Phi_b$:

$$\Phi_b = \begin{pmatrix} \Phi' & \vdots & \\ \cdots & \Phi & \cdots \\ & \vdots & \Phi_d^{\tau'} \end{pmatrix}, \quad (38)$$

$$\Gamma_b = \begin{pmatrix} \Gamma'_\rho \\ 0 \\ \Gamma'_d \end{pmatrix}$$

The observer design is accordingly standard; the observation equation holds true:

$$\hat{x}(k+1) = \Phi_b \hat{x}(k) + \Gamma_b u(k) + L(y(k) - H\hat{x}(k)) \quad (39)$$

The control law is slightly modified; in order to suppress disturbances, the observed disturbance $\hat{\rho}$ is subtracted from the manipulated variable:

$$u(k) = K(k)\hat{x}(k) - \hat{\rho}(k) \quad (40)$$

With corresponding output matrices it is possible to mask out $\hat{x}$ and $\hat{\rho}$ for the implementation:

$$H_x = (0 \ldots I \ldots 0), H_{\hat{\rho}} = (I \ldots 0 \ldots 0) \quad (41)$$

The control loop then has the structure in accordance with FIG. 5.

As is furthermore shown in FIG. 5, intermediate circuit energy values w(t) are also measured here and fed to the input of the analog/digital converter 18b; the intermediate circuit energy values are determined by measurement of the voltages $U_{C,Sub}$ at the submodules (cf. FIG. 3) and via known calculation of the intermediate circuit energy values from said voltages. In this case, too, delays arise as a result of the further processing and transmission of the intermediate circuit energy values (cf. block 20). These delayed intermediate circuit energy values $w_d(k)$ are made available to an estimator unit 21A, in which, by means of estimation (on the basis of a signal model of the intermediate circuit energy values), which will be explained in even greater detail below with reference to FIG. 6, actual state intermediate circuit energy values $\hat{w}(k)$ are available at the output of the estimator unit 21A. By means of a conditioning unit 21A' disposed downstream of the estimator unit 21A, said actual state intermediate circuit energy values $\hat{w}(k)$ are compared with desired intermediate circuit energy values $\hat{w}_{desired}(t)$ and the difference is fed to the control unit 16. The state intermediate energy values w(k) that are wanted are thereupon established at the output of the converter 1.

Figure 6:
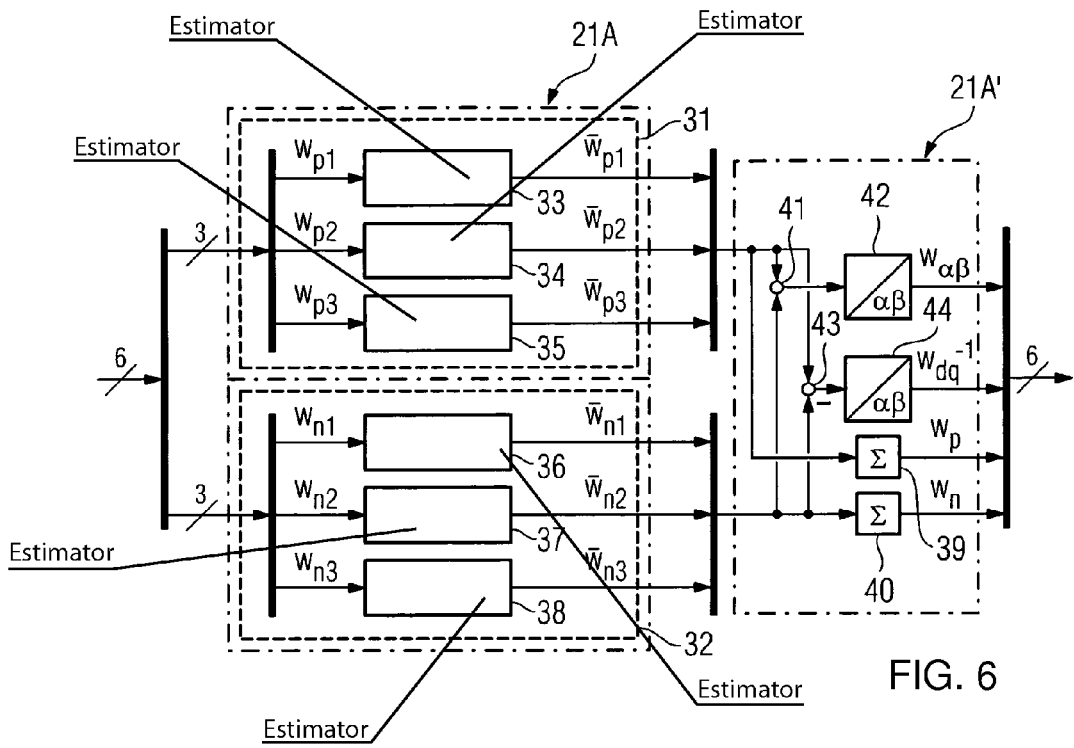
FIG. 6 shows an exemplary embodiment of a preferably used estimator unit with conditioning unit disposed downstream.

The estimator unit 21A illustrated in FIG. 6 is connected to all six power semiconductor valve branches 2 of the converter 1, which is symbolized by the numeral "6" in the schematic illustration. In this case, the connection is effected such that the three respective positive-side (e.g. upper in FIG. 2) power semiconductor valve branches 2 are fed to the estimator unit 21A separately from the three respective negative-side (lower in FIG. 2) power semiconductor valve branches 2, in each case symbolized by the numeral "3".

The estimator unit 21A comprises a first estimator subunit 31 and a further estimator subunit 32; the estimator subunit 31 in turn is equipped with a respective estimator 33, 34 and 35, which are connected to a respective positive-side power semiconductor valve branch 2 of the converter 1 and to which intermediate circuit energy values w1p to w3p of the positive-side power semiconductor valve branches 2 are thus applied. Intermediate circuit energy values w1n to w3n of the negative-side power semiconductor valve branches 2 are correspondingly fed to estimators 36, 37 and 38 of the estimator subunit 32.

The estimators 33 to 38 are in each case parameter estimators, for example least squares estimators. In the exemplary embodiment described here, an oscillation model of the intermediate energy values w(t) is predefined for each parameter estimator 33 to 38, which model can be described mathematically by the following equation:

$$w(t) = A_0(t) + A_{11}(t)\cos(\omega t) + A_{12}(t)\sin(\omega t) + A_{21}(t)\cos(2\omega t) + A_{22}(t)\sin(2\omega t)$$

In this equation, $A_0(t)$ indicates the DC component of the intermediate circuit energy values w(t), and $A_{11}(t)$ to $A_{22}(t)$ indicate further parameters of the oscillation model; $\omega$ denotes the angular frequency of the AC voltage power supply system connected to the converter 1. For the sake of better clarity, FIG. 6 does not specifically illustrate how a measurement variable corresponding to the frequency of the AC voltage power supply system is applied to the individual least squares estimators.

In the oscillation model described by the above equation, time-dependent parameters $A_0(t)$ to $A_{22}(t)$ are used by the least squares estimators, which leads to a high accuracy of the estimation, but is also relatively complex. By way of example, a linear function or an exponential function can be chosen as time dependence.

The positive-side intermediate circuit energy values $w_{1p}$, $w_{2p}$ and $w_{3p}$ are accordingly applied to the least squares estimators 33 to 35 assigned to the positive-side three-phase voltage source 2P. The same correspondingly applies with regard to the estimators 36 to 38. The estimated intermediate circuit energy values $\overline{w}_{1p}$, $\overline{w}_{2p}$ and $\overline{w}_{3p}$ and also $\overline{w}_{1n}$, $\overline{w}_{2n}$ and $\overline{w}_{3n}$ and that occur on the output side are fed to the conditioning unit 21A', in which the intermediate circuit energy value sums $w_p$ of the positive-side 2P and $w_n$ of the negative-side 2N three-phase voltage source are respectively formed in summing units 39 and 40. The intermediate circuit energy values $\overline{w}_{1p}$ and $\overline{w}_{3n}$ represent average values which, in principle, can also be formed in some other way. In a summing unit 41, the intermediate circuit energy values $\overline{w}_{p1}$ to $w_{n3}$ are added element by element, that is to say $\overline{w}_{p1}$ and $\overline{w}_{n1}$, $\overline{w}_{p2}$ and $\overline{w}_{n2}$ and also $\overline{w}_{p3}$ and $\overline{w}_{n3}$. The three values thus obtained are subjected to an alpha-beta transformation in a transformation element 42, such that the alpha-beta-transformed, measured intermediate circuit energy value sums $w_{\alpha\beta}$ of the positive-side three-phase voltage source occur at the output of said transformation element. In a difference forming unit 43, the intermediate circuit energy values $\overline{w}_{p1}$ to $w_{n3}$ are subtracted from one another element by element and alpha-beta-transformed, measured intermediate circuit energy value differences $w_{dq^{-1}}$ between positive- and negative-side three-phase voltage source 2P and 2N are formed therefrom in a further transformation element 44. The variables, $w_{\alpha\beta}$, $w_{dq^{-1}}$, $w_p$ and $w_n$ are fed together with the variables $\hat{x}(k)$, $\hat{x}_{\alpha\beta}(k)$, $\hat{x}_{dq^{-1}}(k)$ of the transformation component 21' to the control unit 16 (cf. e.g. FIG. 5) and processed therein.

Figure 7:
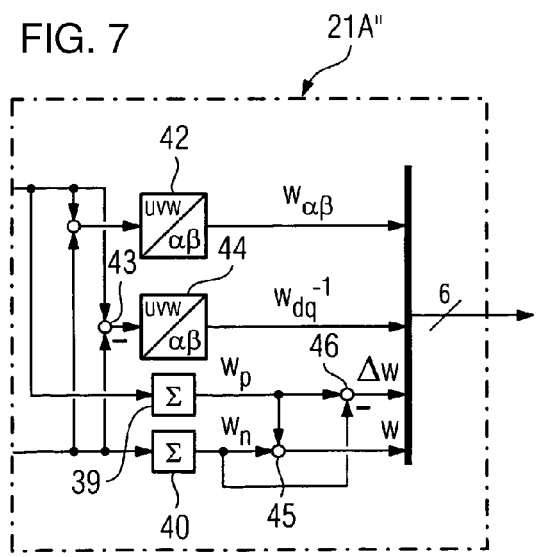
FIG. 7 shows an exemplary embodiment of an alternative conditioning unit.

With the conditioning unit 21A'' illustrated in FIG. 7, it is possible to carry out the alternative embodiment of the method according to the invention using the total energy of the converter 1. For this purpose, in the conditioning unit 21A'', a further summing unit 45 and a further difference forming unit 46 are disposed downstream of the two summing units 39 and 40; at the output of the further summing unit 45, the total energy $w$ of the converter 1 results from the sum of the intermediate circuit energy values of the positive- and negative-side three-phase voltage source 2P and 2N, and, at the output of the further difference forming unit 46, the difference $\Delta w$ results from the values for 2P and 2N.

As shown in FIGS. 4 and 5, the output values of the transformation component 21' and of the conditioning unit 21A' are fed via the adding unit 15 to the control unit 16, which is formed by a periodic controller having a periodically time-variant gain. The way in which this controller is embodied in specific detail and the way in which balancing and converter control can be effected by means of the above-described method and arrangement according to the invention are explained below.

So-called horizontal balancing can be realized with the aid of DC current asymmetries or circulating DC currents of the converter 1, without the power supply system or DC current being influenced thereby. Taking as a basis the sums of the energies $w_1$, $w_2$, $w_3$ in the three branches of the converter 1, where $w_1=W_{p1}+W_{n1}$, $w_2=W_{p2}+W_{n2}$ and $w_3=W_{p3}+W_{n3}$ (cf. FIG. 6), the relationship (41) can then be established in the context of a power consideration:

$$\begin{pmatrix} \dot{w}_1 \\ \dot{w}_2 \\ \dot{w}_3 \end{pmatrix} = \begin{pmatrix} u_{d0}+\overline{u}_1 & 0 & 0 \\ 0 & u_{d0}+\overline{u}_2 & 0 \\ 0 & 0 & u_{d0}+\overline{u}_3 \end{pmatrix} \cdot \begin{pmatrix} \overline{i}_1 \\ \overline{i}_2 \\ \overline{i}_3 \end{pmatrix} \quad (41)$$

In this equation, $\dot{w}_1$, $\dot{w}_2$, $\dot{w}_3$ denote the time derivative of the energies and thus a power in each case, and $u_{d0}$ denotes the internal DC voltage of the converter; $\overline{i}_1$ to $\overline{i}_3$ and $\overline{u}_1$ and $\overline{u}_3$ are the DC variables in the branches of the converter. If equation (41) is simplified by assuming an operating point $\overline{u}_1=\overline{u}_2=\overline{u}_3=\overline{u}_{dAP}$, then the relationship (41) is simplified to equation (42) below:

$$\begin{pmatrix} \dot{w}_1 \\ \dot{w}_2 \\ \dot{w}_3 \end{pmatrix} = u_{d_{AP}} \cdot \begin{pmatrix} \overline{i}_1 \\ \overline{i}_2 \\ \overline{i}_3 \end{pmatrix} \quad (42)$$

After an $\alpha\beta$ transformation and permissible omission of the zero phase sequence system, the following then results with regard to horizontal balancing $$\begin{pmatrix} \dot{w}_\alpha \\ \dot{w}_\beta \end{pmatrix} = \underbrace{\begin{pmatrix} u_{d_{AP}}/2 & 0 \\ 0 & u_{d_{AP}}/2 \end{pmatrix}}_{A_{bBal}} \cdot \begin{pmatrix} i_{Kr_\alpha} \\ i_{Kr_\beta} \end{pmatrix} \quad (43)$$

in which $\dot{w}_\alpha$, $\dot{w}_\beta$ and $i_{Kr\alpha}$, $i_{Kr\beta}$ indicate $\alpha\beta$-transformed powers or circulating currents.

If the vertical balancing at the operating point $U_{MMCAP}$ of the converter 1 is designated by $U_{MMCAP}=U_N$, where $u_N$ denotes the power supply system voltage, then this gives rise to the following in complex notation:

$$\begin{pmatrix} \dot{w}_{11} \\ \dot{w}_{22} \\ \dot{w}_{33} \end{pmatrix} = \text{Re}\left\{ \begin{pmatrix} u_1 & 0 & 0 \\ 0 & u_2 & 0 \\ 0 & 0 & u_3 \end{pmatrix} \cdot \begin{pmatrix} i_1^* \\ i_2^* \\ i_3^* \end{pmatrix} \right\} \quad (44)$$

in which $\dot{w}_{11}$, $\dot{w}_{22}$ and $\dot{w}_{33}$ denotes the time derivative of the energy on the power supply system side in the three phases, $u_{N1}$ to $u_{N3}$ denote the phase voltages, and $i_1^*$ to $i_3^*$ denote complex conjugate power supply system currents. After conversion and transformation whilst resorting to the negative phase sequence system in the circulating current, the following then arises $$\begin{pmatrix} \dot{w}_{d^{-1}} \\ \dot{w}_{q^{-1}} \end{pmatrix} = \underbrace{\begin{pmatrix} -\frac{1}{2}u_N & 0 \\ 0 & -\frac{1}{2}u_N \end{pmatrix}}_{A_{vBal}} \cdot \begin{pmatrix} i_{Kr_{d^{-1}}} \\ i_{Kr_{q^{-1}}} \end{pmatrix} \quad (45)$$

For modeling the converter 1, the known system model is taken as a basis—here in the dq system:

$$\dot{x}=A_{dq}x+B_{dq}u, x_{dq}=(i_{N_d}i_{N_q}i_d i_{Kr_d} i_{Kr_q}) \quad (46)$$

If an extension to the $\alpha\beta$ and the negative phase sequence system of the circulating current is effected here, then the new state vector reads as follows:

$$x=(i_{N_d}i_{N_q}i_d i_{Kr_d} i_{Kr_q} i_{Kr_\alpha} i_{Kr_\beta} i_{Kr_{d-1}} i_{Kr_{q-1}}) \quad (47)$$

The following then holds true for the system matrix:

$$A = \begin{pmatrix} A_{dq} & 0 & 0 & 0 & 0 \\ 0 & -\frac{R_{Kr}}{L_{Kr}} & 0 & 0 & 0 \\ 0 & 0 & -\frac{R_{Kr}}{L_{Kr}} & 0 & 0 \\ 0 & 0 & 0 & -\frac{R_{Kr}}{L_{Kr}} & \omega \\ 0 & 0 & 0 & -\omega & -\frac{R_{Kr}}{L_{Kr}} \end{pmatrix}, \quad (48)$$

wherein the signs of $\omega$ are opposite to those in $A_{dq}$. The variables $R_{Kr}$ and $L_{Kr}$ are evident from FIG. 1.

The following is furthermore summarized:

$$A_{\alpha\beta} = \begin{pmatrix} -\frac{R_{Kr}}{L_{Kr}} & 0 \\ 0 & -\frac{R_{Kr}}{L_{Kr}} \end{pmatrix}, A_{dq^{-1}} = \begin{pmatrix} -\frac{R_{Kr}}{L_{Kr}} & \omega \\ -\omega & -\frac{R_{Kr}}{L_{Kr}} \end{pmatrix} \quad (49)$$

If the following holds true for $$u = (u_{pd} u_{pq} u_d u_{nd} u_{nq}), \quad (50)$$

then the following holds true for $$B_{dq} = \begin{pmatrix} -\frac{1}{L_L} & 0 & 0 & \frac{1}{L_L} & 0 \\ 0 & -\frac{1}{L_L} & 0 & 0 & \frac{1}{L_L} \\ 0 & 0 & -\frac{1}{L'_d} & 0 & 0 \\ -\frac{1}{2L_{Kr}} & 0 & 0 & -\frac{1}{2L_{Kr}} & 0 \\ 0 & -\frac{1}{2L_{Kr}} & 0 & 0 & -\frac{1}{2L_{Kr}} \end{pmatrix} \quad (51)$$

where $R_L = 1/2\, R_{Kr} + R_o$, $L_L = 1/2\, L_{Kr} + L_o$, $R'_d = 2/3\, R_{Kr} + R_r$, and $L'_d = 2/3\, L_{Kr} + L_d$ (cf. FIG. 1). The other frequency ranges of the circulating current are linked to one another via the same input variables. This linkage can be expressed by the inverse transformation $T_{dq}^{-1}(t)$. The following thus holds true for $$B(t) = \begin{pmatrix} B_{dq} \\ T_{dq}^{-1}(t)B_{Kr} & 0 & T_{dq}^{-1}(t)B_{Kr} \\ T_{dq}^{-2}(t)B_{Kr} & 0 & T_{dq}^{-2}(t)B_{Kr} \end{pmatrix}, \text{ where}$$

$$B_{Kr} = \begin{pmatrix} -\frac{1}{2L_{Kr}} & 0 \\ 0 & -\frac{1}{2L_{Kr}} \end{pmatrix}$$

The system model A,B(t) is therefore a time-variant system. Since $T_{dq}(t)$ is repeated periodically, this is referred to as a periodically time-variant system, or PLTV system (periodic linear time-variant system). If a matrix $A_w$ is defined in accordance with the following equation (53)

$$A_w = \begin{pmatrix} \frac{u_{pp}}{2} & \frac{u_{pg}}{2} & \frac{u_{d0}}{2} & u_{P_p} & u_{P_p} \\ -\frac{u_{n_p}}{2} & -\frac{u_{n_q}}{2} & \frac{u_{d0}}{2} & u_{n_p} & u_{n_p} \end{pmatrix} \quad (53)$$

it is possible to describe the system matrix $A_{p2TV}$ for such a system and the input matrix $B_{PLTV}$ $$A_{PLTV} = \begin{pmatrix} A_{dq} & 0 & 0 & 0 & 0 & 0 \\ 0 & A_{\alpha\beta} & 0 & 0 & 0 & 0 \\ 0 & 0 & A_{dq^{-1}} & 0 & 0 & 0 \\ 0 & A_{hBal} & 0 & 0 & 0 & 0 \\ 0 & 0 & A_{vBal} & 0 & 0 & 0 \\ A_w & 0 & 0 & 0 & 0 & 0 \end{pmatrix},$$

-continued $$B_{PLTV}(t) = \begin{pmatrix} B(t) \\ 0 \\ 0 \\ 0 \\ 0 \\ 0 \end{pmatrix}$$

and also the state variable $x_{PLTV}$ and the input variable $u_{PLTV}$ with $$x_{PLTV} = \begin{pmatrix} x \\ x_{\alpha\beta} \\ x_{dq^{-1}} \\ w_{\alpha\beta} \\ w_{dq^{-1}} \\ w \end{pmatrix}, u_{PLTV} = u \quad (55)$$

Methods are known for designing optimal controllers for PLTV systems. Recourse is had thereto here in order to make possible a common controller design for the entire converter control including energy control and balancing. The designed controller replaces the function of all controllers which previously fulfilled the corresponding tasks. Detailed descriptions of one method are found in Bittanti, S.; Colaneri, P.; De Nicolao, G.: "The Periodic Riccati Equation": In: Bittanti, S. (ed.); Laub, A. J. (ed.); Willems, J. C. (ed.): The Riccati Equation. Berlin: 1991 and Gorges, Daniel; Izák Michal; Liu Steven "Optimal Control of Systems with Resource Constraints". In: Proceedings of the 46$^{th}$ IEEE Conference on Decision and Control, 2007, pages 1070-1075.

As an alternative to the control of the energy of the positive-side 2P and of the negative-side 2N three-phase voltage source, it is also possible to control the deviation between these sources $\Delta w$ by means of a positive phase sequence system in the circulating current—to be precise as pure circulating active current. The matrix $A_w$ then reads as follows:

$$A_w \begin{pmatrix} 0 & 0 & 0 & \frac{-u_N}{s} & 0 \\ -u_{N_p} & -u_{N_q} & u_{d0} & 0 & 0 \end{pmatrix} \quad (56)$$

In the modeling of the converter 1 from equation (54), $A_{PLTV}$ is always constant and $B_{PLTV}(t)$ is periodically time-variant. If sampling is effected 512 times per power supply system period, p=512 holds true. Furthermore, $$t_k = k \cdot \frac{2\pi}{\omega \cdot p},$$

then holds true for the sampling instants. The continuous periodically time-variant system $A_k$, $B_k$ and its continuous weighting matrices Q, N, R can be discretized in a known manner, such that the time-discrete optimization problem is subsequently obtained from equation (5.17):

$$\min_{u(k)} \sum_{k=0}^{\infty} \begin{pmatrix} x(k) \\ u(k) \end{pmatrix}^T \begin{pmatrix} Q_k & N_k \\ N_k^T & R_k \end{pmatrix} \begin{pmatrix} x(k) \\ u(k) \end{pmatrix} \quad (57)$$

-continued $$NB: \begin{cases} x(k+1) = \Phi_k x(k) + \Gamma_k u(k) \\ x(0) = (x_1^T(0) \ldots x_N^T(0))^T \end{cases}$$

In the known method for controller design discussed above, so-called lifting is carried out, which in principle represents a further transformation, in which the p-periodic PLTV system is converted into an LTI system (linear time-invariant system). In this case, the state equation is solved over one period, that is to say p discretization steps:

$$x(k+1) = \hat{\Phi}_k x(k) + \hat{\Gamma}_k \hat{u}(k)$$

$$x(k+2) = \hat{\Phi}_{k+1} x(k+1) + \hat{\Gamma}_{k+1} \hat{u}(k+1)$$

$$= \hat{\Phi}_{k+1} \hat{\Phi}_k x(k) + \hat{\Phi}_{k+1} \hat{\Gamma}_k \hat{u}(k) + \hat{\Gamma}_{k+1} \hat{u}(k+1)$$

$$\vdots$$

$$x(k+p) = \Psi_{k+p,k} x(k) + \Psi_{k+p,k+1} \hat{\Gamma}_k \hat{u}(k) +$$

$$\Psi_{k+p,k+2} \hat{\Gamma}_{k+1} \hat{u}(k+1) + \ldots + \hat{\Gamma}_{k+p-1} \hat{u}(k+p+1)$$

where $\Psi_{k+p,k} = \hat{\Phi}_{k+p-1} \hat{\Phi}_{k+p-2} \ldots \hat{\Phi}_k$ $$= \underbrace{\Psi_{k+p,k}}_{\Psi_k} x(k) +$$

$$\underbrace{(\Psi_{k+p,k+1} \hat{\Gamma}_k \Psi_{k+p,k+2} \hat{\Gamma}_{k+1} \ldots \hat{\Gamma}_{k+p-1})}_{\hat{\Gamma}_k} \begin{pmatrix} \hat{u}(k) \\ \hat{u}(k+1) \\ \vdots \\ \hat{u}(k+p-1) \end{pmatrix}$$

It is then possible to use known optimal controller design methods for LTI systems. The result is a p-periodic controller. The control unit 16 therefore has periodically time-variant gains. The implementation can take place, for example, by periodic changeover of the controller matrices of $K_1 \ldots K_{512}$.

Figure 8:
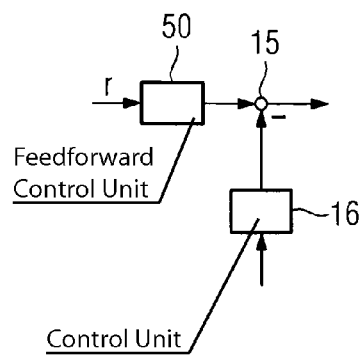
FIG. 8 shows an alternative configuration of the input part of the arrangement in accordance with FIG. 4.

If the arrangement according to the invention uses an input structure as illustrated in FIG. 8 with a control unit 16 as periodic controller between the transformation component 21' or the conditioning unit 21A' and the adding unit 15, then it is also possible to use a periodic feedforward control unit 50 with a transfer response N(k)

$$N(k) = N_v^2 + K_k \cdot N_x \quad (59)$$

wherein $N_v$ denotes the transfer property of the feedforward control unit 14 and $N_x$ denotes the transfer property of the mapping unit 14' and $K_k$ denotes the control response of the control unit 16 in accordance with FIG. 4.

An observer which takes account of disturbances, harmonics, measurement and actuating dead times is made possible according to the invention. By means of such an observer, a control structure embodied as state control, for example, can provide undelayed estimated measurement values and, with the aid of the determined disturbances and harmonics, indirectly compensate for these. The overall control thus acquires the ability to compensate for different harmonics and disturbances in the positive and negative phase sequence and αβ system, without the response to desired value changes being adversely influenced.

As a result of accelerated control and fast disturbance variable compensation, the intermediate circuit energy control and the balancing of the energies of the upper and lower three-phase voltage sources can be improved such that in comparison with known solutions, either a smaller number of submodules per branch or a lower capacitor capacitance suffices to control the same power supply system fault situations. A smaller number of modules or a lower capacitor capacitance is manifested in lower converter costs.

The possibility for harmonic compensation furthermore affords the advantage that economic utilization of the converter is achieved since acquiring this ability means that power supply system filters of active or passive type can be obviated.

Better control of power supply system fault situations means a shorter failure time or lower failure probability, which may be an advantage from an economic standpoint for power supply system operators.

The invention claimed is:

1. A method for controlling a converter having controllable power semiconductors, the method comprising the following steps:
    comparing actual state values describing a state of the converter with desired state values to obtain control difference values;
    feeding the control difference values to a control unit constructed as a periodic controller having a periodically time-variant gain and generating actuating voltage values at its output;
    providing control signals with control electronics depending on the actuating voltage values and transmitting the control signals to the power semiconductors of the converter;
    generating actuating voltage values with the control unit to make the control difference values as small as possible;
    calculating the actual state values with an observer unit proceeding from the actuating voltage values and taking measured current values into account;
    calculating actual state intermediate circuit energy values with an estimator unit taking measured intermediate circuit energy values of a positive-side and a negative-side three-phase voltage source of the converter into account;
    modeling the converter with the observer unit and the estimator unit, causing the calculated actual state current values and actual state intermediate circuit energy values in the steady state to correspond to fault-free current and intermediate circuit energy values; and
    feeding the fault-free current and intermediate circuit energy values to the control unit.

2. The method according to claim 1, which further comprises:
    providing the observer unit with a periodically time-variant system model proceeding from a general state equation $$\dot{x} = A \cdot x + B \cdot u$$

with x as a state variable, $\dot{x}$ as a time derivative of the state variable, A as a system matrix, B as an input matrix and u as an input variable, having a time-invariant system matrix $A_{PLTV}$ and a time-variant input matrix $B_{PLTV}(t)$ with $$x_{PLTV} = \begin{pmatrix} x \\ x_{\alpha\beta} \\ x_{dq^{-1}} \\ w_{\alpha\beta} \\ w_{dq^{-1}} \\ w \end{pmatrix},$$

where x denotes a measured, Park-transformed current, $x_{\alpha\beta}$ denotes an alpha-beta-transformed current and $x_{dq}^{-1}$ denotes a doubly Park-inverse-transformed measured current (negative phase sequence system), $w_{\alpha\beta}$ denotes alpha-beta-transformed, measured intermediate circuit energy value sums of upper and lower three-phase voltage sources and $w_{dq}^{-1}$ denotes alpha-beta-transformed, measured intermediate circuit energy value differences between upper and lower three-phase voltage sources, and w denotes measured intermediate circuit energy values of the entire converter.

3. The method according to claim 1, wherein the desired state values are desired current values and desired intermediate circuit energy values.

4. The method according to claim 1, which further comprises forming the desired state values from predefined desired values with a periodically operating feedforward control unit.

5. The method according to claim 1, which further comprises implementing the periodically time-variant gain in the periodic controller by a periodic changeover of controller matrices.

6. The method according to claim 1, wherein the observer unit takes disturbance effects into account, causing the actual state current values in the steady state to correspond to the current measurement values freed of disturbance effects.

7. The method according to claim 6, which further comprises:
providing, with the observer unit, besides the actual state current values being fault-free in the steady state, disturbed state model measurement values corresponding to measurable state measurement values;
comparing the state model measurement values with state measurement values obtained by measurements and obtaining a model measurement value deviation;
feeding the model measurement value deviation to a model unit on the input side; and
carrying out the modeling to make the model measurement value deviation as small as possible.

8. The method according to claim 7, which further comprises feeding the model measurement value deviation to the model unit through a feedback unit amplifying the model measurement value deviation.

9. The method according to claim 6, which further comprises taking disturbance effects into account by taking faults originating from an electrical power supply system connected to the converter into account and taking faults caused by the converter into account.

10. The method according to claim 6, which further comprises:
modeling the observer unit with the aid of a state space model in accordance with $$\hat{x}'_p(k+1) = \Phi_p \cdot \hat{x}'_p(k) + \Gamma u_p(k)$$

$$\hat{y}_d(k) = H_p \hat{x}'_p(k)$$

wherein $\hat{x}'_p(k)$ corresponds to a state vector of the converter including disturbed states, $u_p(k)$ corresponds to a vector of actuating voltages, $\Phi$, $\Gamma$ and H correspond to model matrices, and $\hat{y}_d(k)$ corresponds to a vector of state model measurement values beset by disturbances.

11. The method according to claim 1, which further comprises taking delay effects into account with the observer unit, causing the actual state current values to correspond to undelayed and undisturbed current measurement values freed of disturbance and delay effects.

12. The method according to claim 11, which further comprises:
providing, with the observer unit, besides the undelayed actual state values, delayed state model measurement values corresponding to measurable state measurement values;
comparing the state model measurement values with state measurement values obtained by measurements;
obtaining a model measurement value deviation;
feeding the model measurement value deviation to the model unit on the input side; and
carrying out the modeling to make the model measurement value deviation as small as possible.

13. The method according to claim 11, which further comprises feeding the model measurement value deviation to a model unit through a feedback unit amplifying the model measurement value deviation.

14. The method according to claim 11, which further comprises taking delay effects into account by taking measurement delays arising during a digital detection of the state variables of the converter into account and taking actuating delays caused by the control electronics into account.

15. The method according to claim 11, which further comprises during the detection of the state measurement values, measuring the state variable of the converter, continuously sampling measurement signals being obtained in sampling steps to obtain samples, subsequently digitizing the samples, and effecting the modeling of the measurement delays being established under an assumption that the measurement delays correspond to a time duration of a plurality of sampling steps.

16. The method according to claim 15, which further comprises taking a measurement delay of four sampling steps into account.

17. The method according to claim 11, which further comprises modeling an actuating delay T in accordance with $$\tau = (l-1) \cdot T + \tau'$$

wherein l corresponds to a number of sampling steps having a sum less than the actuating delay $\tau$, and $\tau'$ as a remainder is shorter than a time duration T between two sampling steps k.

18. The method according to claim 17, which further comprises taking two sampling steps into account during the modeling of the actuating delay.

19. The method according to claim 11, which further comprises:
modeling the converter with the aid of a state space model in accordance with $$\hat{x}'(k+1) = \Phi \hat{x}'(k) + \Gamma u(k)$$

$$\hat{y}_d(k) = H \hat{x}'(k)$$

wherein $\hat{x}'(k)$ corresponds to a state vector of the converter including delayed states, $u(k)$ corresponds to a vector of the actuating voltages, $\Phi$, $\Gamma$ and H correspond to model matrices, and $\hat{y}_d(k)$ corresponds to a vector of state model measurement values beset by delays.

20. The method according to claim 1, which further comprises:
determining state intermediate circuit energy values from measured intermediate circuit energy values with an estimator unit having recourse to a signal model of the intermediate circuit energy values;
calculating parameters of the signal model of the intermediate circuit energy values with the estimator unit while determining in each case a DC variable representing state intermediate circuit energy values of the positive-side and of the negative-side three-phase voltage source of the converter; and feeding state intermediate circuit energy values to the control unit in addition to the state current values.

21. The method according to claim 20, which further comprises:

respectively individually detecting the state intermediate circuit energy values of positive-side and of negative-side power semiconductor valve branches of the converter;

calculating the parameters of the signal model of the intermediate energy values with a respective parameter estimator of the estimator unit; and respectively individually adding the parameters of the positive-side and the negative-side power semiconductor valve branches that respectively describe a DC component, to form the intermediate circuit energy DC variables.

22. The method according to claim 21, which further comprises using parameter estimators with a recursive algorithm.

23. The method according to claim 22, which further comprises:

using a parameter estimator with an oscillation model w(t) for the intermediate circuit energy values $w(t)=A_0+A_{k1}*\cos(k\omega t)+A_{k2}*\sin(k\omega t)$ for k=1 to n, as the estimator;

in which $A_0$ indicates the DC component of the intermediate circuit energy values and $A_{k1}$ and $A_{k2}$ indicate further parameters of the oscillation model and ω indicates the angular frequency of an AC voltage power supply system connected to the converter.

24. The method according to claim 23, which further comprises providing an oscillation model with time-dependent parameters $A_0(t)$ to $A_{k2}(t)$.

25. The method according to claim 24, which further comprises predefining a time dependence of the parameters by a linear function or an exponential function.

26. The method according to claim 23, which further comprises providing an oscillation model with temporally constant parameters $A_0$ to $A_{k2}$.

27. The configuration according to claim 26, which further comprises:

a cut-out unit having an output;

a summing circuit having an output, one input connected to the output of the converter and a further input connected to said output of said cut-out unit;

a feedback unit having an output and being connected to said output of said summing circuit;

said observer unit having a model unit simulating the converter and having an input connected to said output of said control unit, another input connected to said output of said feedback unit and an output connected to said cut-out unit; and a further cut-out unit connected between said output of said model unit and said input of said control unit.

28. The method according to claim 1, wherein the converter is a multilevel converter having power semiconductor valve branches connected to one another to form a bridge circuit, each power semiconductor valve branch is formed of a series circuit formed by submodules and each submodule includes a circuit formed by power semiconductors and a capacitor unit disposed in parallel therewith.

29. A configuration for carrying out the method according to claim 1 for controlling a converter having a bridge circuit formed by phase module branches each including a series circuit formed by submodules each having a semiconductor circuit with a connected capacitor, positive-side and negative-side three-phase voltage sources, power semiconductors, and a measurement value output, the configuration comprising:

a control unit having an input connected to the measurement value output of the converter and an output supplying generated actuating voltage values;

control electronics disposed downstream of said control unit, said control electronics providing control signals dependent on the actuating voltage values and transmitting said control signals to the power semiconductors of the converter;

an observer unit disposed between the measurement value output of the converter and said input of said control unit, said observer unit calculating actual state values, proceeding from the actuating voltage values u(k) and taking measured current values into account;

an estimator unit disposed between the measurement value output of the converter and said input of said control unit, said estimator unit calculating actual state intermediate circuit energy values, taking measured intermediate circuit energy values of the positive-side and of the negative-side three-phase voltage sources of the converter into account;

said observer unit and said estimator unit modeling the converter to cause the calculated actual state current values and actual state intermediate circuit energy values in the steady state to correspond to fault-free current and intermediate circuit energy values; and said control unit receiving the fault-free current and intermediate circuit energy values and being constructed as a periodic controller having a periodically time-variant gain.

30. The configuration according to claim 29, wherein said observer unit has a periodically time-variant system model, and said system model proceeds from a general state equation $$\dot{x}=A\cdot x+B\cdot u$$

with x as a state variable, $\dot{x}$ as a time derivative of the state variable, A as a system matrix, B as an input matrix and u as input variable, has a time-invariant system matrix $A_{PLTV}$ and a time-variant input matrix $B_{PLTV}(t)$ with $$x_{PLTV}=\begin{pmatrix} x \\ x_{\alpha\beta} \\ x_{dq^{-1}} \\ w_{\alpha\beta} \\ w_{dq^{-1}} \\ w \end{pmatrix},$$

where x denotes a measured, Park-transformed current, $x_{\alpha\beta}$ denotes an alpha-beta-transformed current and $x_{dq^{-1}}$ denotes a doubly Park-inverse-transformed measured current (negative phase sequence system), $w_{\alpha\beta}$ denotes alpha-beta-transformed, measured intermediate circuit energy value sums of upper and lower three-phase voltage sources, $w_{dq^{-1}}$ denotes alpha-beta-transformed, measured intermediate circuit energy value differences between upper and lower three-phase voltage sources, and w denotes measured intermediate circuit energy values of the entire converter.

31. The configuration according to claim 29, which further comprises a summing circuit disposed upstream of said periodic controller, and a periodic feedforward control unit having an output side connected to said summing circuit and a period corresponding to a period of an AC current.

32. The configuration according to claim 29, wherein said periodic controller is configured to have its periodically time-variant gain effected by a periodic changeover of its controller matrices.

33. The configuration according to claim 29, wherein said observer unit is configured to calculate actual state values proceeding from the actuating voltage values and state measurement values taking disturbance effects and/or delay effects into account to cause the actual state values to correspond to current measurement values being freed of disturbance effects and/or undisturbed in the steady state.

34. The configuration according to claim 29, wherein:
said estimator unit connected to the output of the converter simulates a signal model of intermediate circuit energy values; and
said observer unit and said estimator unit have an output side connected to actual inputs of said control unit.

35. The configuration according to claim 34, wherein:
the converter has six power semiconductor valve branches including three positive-side power semiconductor valve branches and three negative-side power semiconductor valve branches; and
said estimator unit has a respective estimator for each of the three positive-side power semiconductor valve branches and a respective further estimator for each of the three negative-side power semiconductor valve branches.

36. The configuration according to claim 29, wherein the converter is a multilevel converter having power semiconductor valve branches connected to one another to form a bridge circuit, each power semiconductor valve branch is formed of a series circuit formed by submodules and each submodule includes a circuit formed by power semiconductors and a capacitor unit connected in parallel therewith.

37. A method for controlling a converter having controllable power semiconductors, the method comprising the following steps:
comparing actual state values describing a state of the converter with desired state values and obtaining control difference values;
feeding the control difference values to a control unit constructed as a periodic controller having a periodically time-variant gain and generating actuating voltage values at its output;
providing control signals with control electronics depending on the actuating voltage values and transmitting the control signals to the power semiconductors of the converter;
generating actuating voltage values with the control unit to make the control difference values as small as possible;
calculating the actual state values with an observer unit proceeding from the actuating voltage values and taking measured current values into account;
calculating actual state intermediate circuit energy values with an estimator unit taking measured intermediate circuit energy values of a positive-side and of a negative-side three-phase voltage source of the converter into account;
modeling the converter with the observer unit and the estimator unit causing the calculated actual state current values and state intermediate circuit energy values of a total energy of the converter and a difference in the intermediate circuit energy values of the positive-side and of the negative-side three-phase voltage source of the converter in the steady state to correspond to fault-free current and intermediate circuit energy values; and
feeding the fault-free current and intermediate circuit energy values to the control unit.

38. The method according to claim 37, wherein the desired state values are desired current values and desired intermediate circuit energy values.

39. A configuration for carrying out the method according to claim 37 for controlling a converter including a bridge circuit formed by phase module branches each having a series circuit formed by submodules each having a semiconductor circuit with a connected capacitor, positive-side and negative-side three-phase voltage sources, power semiconductors, and a measurement value output, the configuration comprising:
a control unit having an input connected to the measurement value output of the converter and an output supplying generated actuating voltage values;
control electronics disposed downstream of said control unit, said control electronics providing control signals dependent on the actuating voltage values and transmitting said control signals to the power semiconductors of the converter;
an observer unit disposed between the measurement value output of the converter and said input of said control unit, said observer unit calculating actual state values, proceeding from the actuating voltage values and taking measured current values into account;
an estimator unit disposed between the measurement value output of the converter and said input of said control unit, said estimator unit calculating actual state intermediate circuit energy values, taking measured intermediate circuit energy values of the positive-side and the negative-side three-phase voltage sources of the converter into account;
said observer unit and said estimator unit modeling the converter to cause the calculated actual state current values and state intermediate circuit energy values of a total energy of the converter and a difference in intermediate circuit energy values of the positive-side and the negative-side three-phase voltage sources of the converter in a steady state to correspond to fault-free current and intermediate circuit energy values; and
said control unit receiving the fault-free current and intermediate circuit energy values and being constructed as a periodic controller having a periodically time-variant gain.

* * * * *